United States Patent
Naiyang et al.

(10) Patent No.: US 10,620,505 B2
(45) Date of Patent: Apr. 14, 2020

(54) METHOD AND APPARATUS FOR FOCUSING

(71) Applicant: ArcSoft Corporation Limited, Hangzhou (CN)

(72) Inventors: Lin Naiyang, Hangzhou (CN); Xi Wenxing, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 0 days.

(21) Appl. No.: 16/020,113

(22) Filed: Jun. 27, 2018

(65) Prior Publication Data
US 2018/0373123 A1 Dec. 27, 2018

(30) Foreign Application Priority Data

Jun. 27, 2017 (CN) .......................... 2017 1 0502224
Aug. 18, 2017 (CN) .......................... 2017 1 0711655

(51) Int. Cl.
| G03B 13/36 | (2006.01) |
| G06T 7/207 | (2017.01) |
| G06T 7/11 | (2017.01) |
| G06K 9/32 | (2006.01) |
| H04N 5/232 | (2006.01) |
| G06T 7/55 | (2017.01) |
| G01S 3/00 | (2006.01) |
| H04N 9/04 | (2006.01) |

(52) U.S. Cl.
CPC ............... *G03B 13/36* (2013.01); *G01S 3/00* (2013.01); *G06K 9/3241* (2013.01); *G06T 7/11* (2017.01); *G06T 7/207* (2017.01); *G06T 7/55* (2017.01); *H04N 5/23212* (2013.01); *H04N 5/23245* (2013.01); *H04N 9/045* (2013.01)

(58) Field of Classification Search
CPC ............... H04N 5/2258; H04N 5/247; H04N 13/20–96; H04N 5/23212–5/232127; G03B 13/36; G02B 7/28–40
See application file for complete search history.

(56) References Cited

U.S. PATENT DOCUMENTS

2017/0118393 A1* 4/2017 Dayana .................... G06K 9/46
2018/0035017 A1* 2/2018 Kim ......................... H04N 5/04

\* cited by examiner

*Primary Examiner* — Paul M Berardesca
(74) *Attorney, Agent, or Firm* — Osha Liang LLP

(57) ABSTRACT

The present invention provides a method and an apparatus for focusing, applied in image processing field, enabling a terminal in an automatic focusing process not to suspend automatic focus function. The method includes: determining an imaging mode switched from a first picture taking device in a first imaging mode to the first picture taking device or a second picture taking device in a second imaging mode, estimating a second position of the target object in the second imaging mode according to a first position of a target object in the first imaging mode and a principle of epipolar geometry, and searching for the target object in the second imaging mode according to the estimated second position of the target object in the second imaging mode.

14 Claims, 11 Drawing Sheets

METHOD AND APPARATUS FOR FOCUSING

CROSS-REFERENCE TO RELATED APPLICATIONS

This application claims priority to Chinese Patent Application No. 201710502224.6, filed on Jun. 27, 2017, and Chinese Patent Application No. 201710711655.3, filed on Aug. 18, 2017, which are hereby incorporated by reference in their entireties.

TECHNICAL FIELD

The present invention relates to a method for image processing, and in particular, to a method and apparatus for focusing.

BACKGROUND

In recent years, with the rapid development of electronic technology, picture taking function of various devices is more and more powerful, which is not only more and more, and more and more powerful, such as: increasing image pixels, advancing the self-timer function, larger aperture, enhanced optical anti-shake function, accelerating the speed of focus, automatic focus, and various manually operating professional mode.

Many of the existing terminals, such as smart phones, are equipped with a picture taking device such as a camera. The picture taking device of many of the terminals has automatic focus function. Automatic focus is that when the target object is selected, the picture taking device can continue to focus on the target object, so that the target object in the output image remains clear. Even if the terminal with the picture taking device moves, the focusing area always includes the target object to achieve the goal of the automatic focus.

The picture taking device of some terminals supports resolution switching function, but when the resolution changes, the resolution switching function suspends, so that user interaction increases and constant satisfactory images or videos will not be output.

SUMMARY

The present invention provides a method for focusing, solve the problem that when a terminal is in an automatic focusing process and resolution changes, the resolution switching function suspends, so that a function of constant automatic focusing is realized and adaptability to various picture taking mode for a picture taking device is increased.

A method for focusing is provided in a first aspect of the present invention provides, including:

determining that an imaging mode switches from a first imaging mode to a second imaging mode, wherein a position of an image of a target object in the first imaging mode is different from a position of an image of the target object in the second imaging mode;

estimating the position of the image of the target object in the second imaging mode according to a resolution in the first imaging mode, a resolution in the second imaging mode, a field of view in the first imaging mode, a field of view in the second imaging mode and the position of the image of the target object in the first imaging mode; and searching for the image of the target object in the second imaging mode according to the estimated position of the image of the target object in the second imaging mode.

The second aspect of the present invention provides an apparatus for focusing, comprising:

a determining module, configured to determine that an imaging mode switches from a first imaging mode to a second imaging mode, wherein a position of an image of a target object in the first imaging mode is different from a position of an image of the target object in the second imaging mode;

an image position estimating module, configured to estimate the position of the image of the target object in the second imaging mode according to a resolution in the first imaging mode, a resolution in the second imaging mode, a field of view in the first imaging mode, a field of view in the second imaging mode and the position of the image of the target object in the first imaging mode; and a searching module, configured to search for the image of the target object in the second imaging mode according to the estimated position of the image of the target object in the second imaging mode estimated by image position estimating module.

According to a third aspect of the present invention, a method for focusing is provided, comprising:

determining that an imaging mode switches from a first imaging mode to a second imaging mode;

estimating a position of an image of a target object on a picture taking device in the second imaging mode according to a position of an image of the target object on a picture taking device in the first imaging mode and a principle of epipolar geometry;

searching for the image of the target object in the second imaging mode according to the estimated position of the image of the target object on the picture taking device in the second imaging mode.

According to the fourth aspect of the present invention, an apparatus for focusing is provided, wherein the apparatus comprises:

a second determining module, configured to determine that an imaging mode switches from a first imaging mode to a second imaging mode;

a second image position estimating module, configured to estimate a position of an image of a target object on a picture taking device in the second imaging mode according to a position of an image of the target object on a picture taking device in the first imaging mode and a principle of epipolar geometry;

a second searching module, configured to search for the image of the target object in the second imaging mode according to the estimated position of the image of the target object on the picture taking device in the second imaging mode.

According to the fifth aspect of the present invention, a computer-readable medium is provided, wherein the computer-readable medium stores computer instructions that, when executed by a processor, cause the processor to perform steps of the first aspect of the present invention, or any of the first to eleventh implementing way of the first aspect of the present invention, or the third aspect of the present invention, or any of the first to ninth implementing way of the third aspect of the present invention.

According to the sixth aspect of the present invention, an apparatus for focusing is provided, wherein the apparatus includes a storage, a processor and computer instructions stored in the storage and executed by the processor, wherein the computer instructions are executed by the processor to perform steps of the first aspect of the present invention, or any of the first to eleventh implementing way of the first aspect of the present invention, or the third aspect of the present invention, or any of the first to ninth implementing way of the third aspect of the present invention.

The method for focusing provided in the present invention enables a terminal in an automatic focusing process not to suspend automatic focus function to realize a function of constant automatic focusing when a resolution changes, and to increase adaptability to various picture taking mode for a picture taking device to make user interaction decreases and focus on the target object in time, accurately and efficiently to output constant satisfactory images or videos.

DESCRIPTION OF EMBODIMENTS

The following specifically describes the technical solution in the embodiments of the present invention with reference to the accompanying draws in the embodiments of the present invention.

The terms"a first","a second", etc. in the claims, embodiments and figures is used to distinguish different objects and not to limit particular order The term "and/or" is used to describe relationship of related objects, which includes three relationships. For example, A and/or B can describe: A only, A and B, and B only.

In the embodiments of the present invention, the word "exemplary" or "for example" is used to make an example, evidence or explanation. The embodiments or solution described as "exemplary" or "for example" in the embodiments should not be interpreted as better or having more advantage than other embodiments or solution. Precisely, the word "exemplary" or "for example" is used to give a conception in detailed way.

What to be explained is, for conciseness and clarity of the diagram, that the elements in the figures are not necessary to be drawn according to a proportion. For example, for clarity, a size of some elements can be enlarged compared to other elements. Besides, some reference of figures can be repeated among figures in an appropriate place to illustrate corresponding or similar elements.

What to be explained is that because video is constituted by several pictures, the processing method on pictures or images or photos described in the embodiments of the present invention can be applied in videos, and a person skilled in the art can amend the solution disclosed in the present invention to a method applied in video processing without inventive efforts. The amended method should fall in the protection scope of the present invention.

Figure 1:
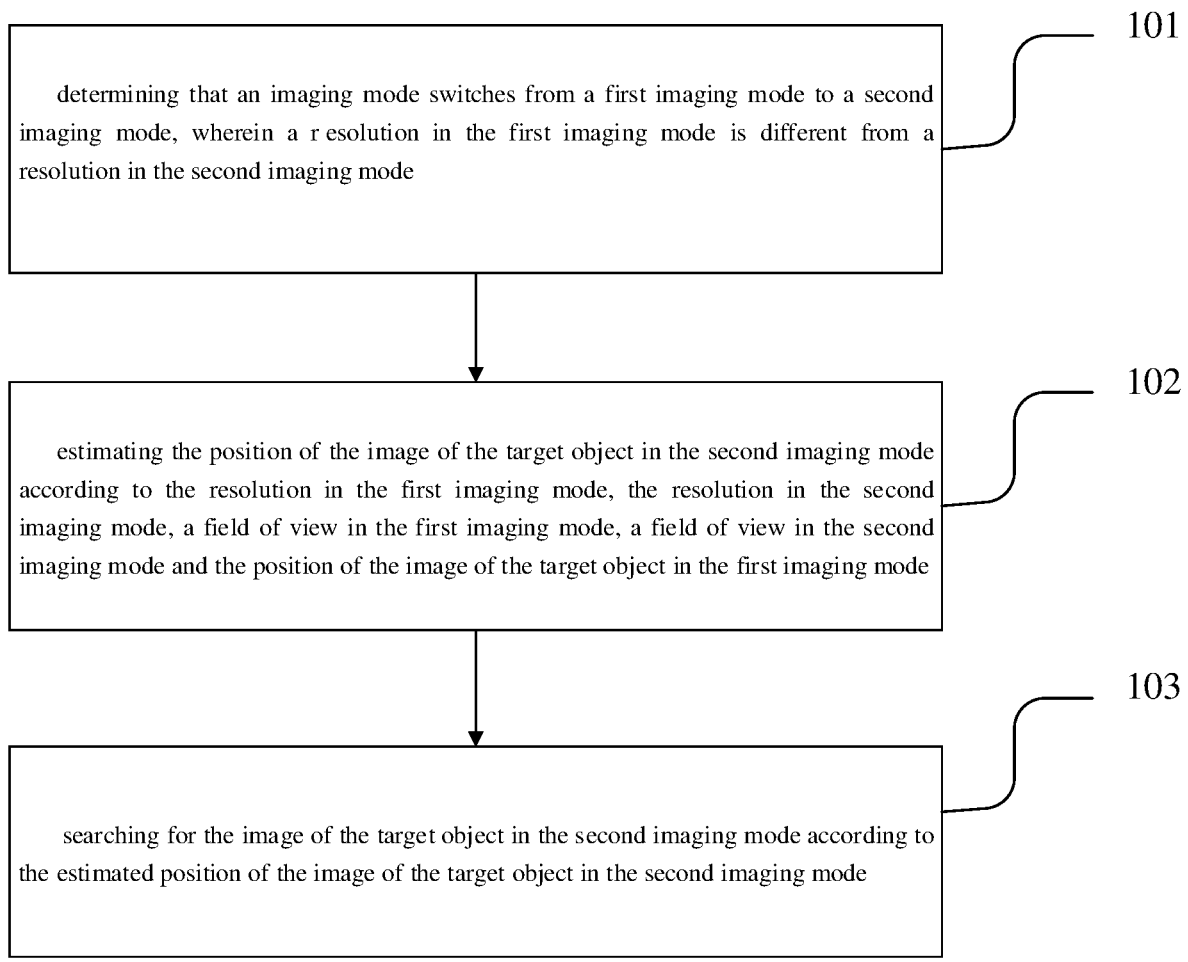
FIG. 1 is a flowchart of a method for focusing provided by the embodiment of the present invention.

The following, referring to FIG. 1, is to illustrate the first embodiment of the present invention. As shown in FIG. 1, the method includes:

Step 101, determining that an imaging mode switches from a first imaging mode to a second imaging mode, wherein a position of an image of a target object in the first imaging mode is different from a position of an image of the target object in the second imaging mode; the position of the image of a target object in the first imaging mode is different from the position of the image of the target object in the second imaging mode may be caused by at least one of the following reasons: a resolution in the first imaging mode is different from a resolution in the second imaging mode, a field of view in the first imaging mode is different from a field of view in the second imaging mode, a position of the picture taking device (camera) in the first imaging mode is different from a position of the picture taking device in the second imaging mode, or other reasons.

That the imaging mode switches from the first imaging mode to the second imaging mode may only include a switch of resolution, or include a switch of combination of multiple imaging modes including the switch of resolution. For example, a switch from a grey-scale map whose resolution is 1440×1080 to a color map whose resolution is 800×600, or a switch from a color map whose resolution is 1440×1080 to a grey-scale map whose resolution is 1440×1280.

Step 102, estimating the position of the image of the target object in the second imaging mode according to a resolution in the first imaging mode, a resolution in the second imaging mode, a field of view in the first imaging mode, a field of view in the second imaging mode and the position of the image of the target object in the first imaging mode;

The field of view (FoV) may include horizontal field of view or vertical field of view.

The position of the image may include a character point representing position of the image of the target object and a size of the image. For example, the point may be a central point or a vertex of the target object or a central point or a vertex of a circumscribed graph (such as circumscribed rectangle or circumcircle), the size of the image may be a width or a height of image of the target object, or the size of the circumscribed graph (such as circumscribed rectangle or circumcircle), such as a width or a height of the circumscribed graph, or a radius or a diameter of the circumcircle. A person skilled in the art should understand the position of the image may be measured by other ways, such as any point of the image of the target object or any point relative to the position of image of the target object. The difference between the position determined by this measuring way and the position of the central point is only a constant vector, which may be acquired or nearly acquired through an amendment from the method disclosed by the present invention without an effort of innovation by a person skilled in the art, and the amended method should be within the protection scope of the present invention.

Figure 2:
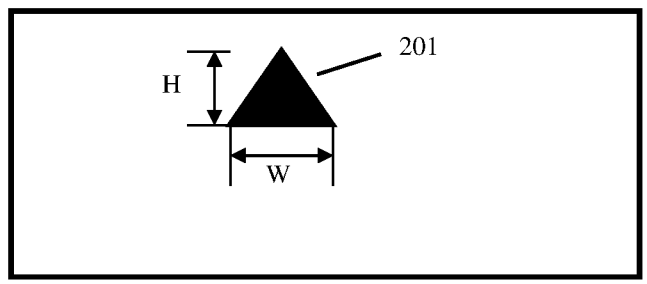
FIG. 2 is an imaging diagram provided by the embodiment of the present invention.

Similarly, a person skilled in the art should understand that the size of the image may include the size of geometry of the image of the target object. For example, the size of the image may be a width and a height of the image of the target object (a width and a height of the circumscribed rectangle), as shown in W and H in FIG. 2, where 201 represent the image of the target object. The size of the image of the target object may also be a value which is slightly bigger than the width and the height of the image of the target object, such as 1.2 times as wide or high as the width and the height of the image of the target object. It may also be a central point which is one of vertexes of the image of the target object, and a radius and central angle of a sector which covers the whole image of the target object. It may also be a radius or a diameter of circumcircle of the image of the target object. A person skilled in the art should understand the above various expressions on the size of the image may be acquired or nearly acquired through an amendment from the method disclosed by the present invention without an effort of innovation by a person skilled in the art (circumscribed graphs can be got by each other, and the sector can be got by only a change of coordinate system), and the amended method should be within the protection scope of the present invention.

Step 103, searching for the image of the target object in the second imaging mode according to the estimated position of the image of the target object in the second imaging mode.

Cause generally a picture taking device has a digital image stabilization (DIS) module, the output image is cut, which may influence the accuracy of estimated position of the image of the target object. So the image of the target object may be searched for in a larger area, such as two times as big as the area of the image of target object after switching to the second imaging mode.

In this step, the searching for the image of the target object according to the estimated position of the image of the target object in the second imaging mode includes:

determining a searching area by the estimated character point representing position of the image of the target object and the size of the image in the second imaging mode, such as searching in a rectangle area whose central point is the estimated central point of the image of the target object in the second imaging mode and whose width and height is the estimated width and height of the image of the target object in the second imaging mode or several times as that, or the width and height of the image of the target object in the first imaging mode or several times as that. For example, the searching may be done in a round area, whose central point is the estimated central point of the image of the target object in the second imaging mode and whose radius is equal to a radius of the circumcircle of the image of the target object in the second imaging mode or equal to several times as that. For example, the searching may be done in a round area, whose central point is the estimated central point of the image of the target object in the second imaging mode and whose radius is equal to a radius of the circumcircle of the image of the target object in the first imaging mode or equal to several times as that. For example, the searching may be done in a rectangle area, whose width and height is equal to the width and height of the image of the target object in the first imaging mode or equal to several times as that, or whose width and height is equal to the estimated width and height of the image of the target object in the second imaging mode or equal to several times as that. For example, the searching may be done in a rectangle area, whose vertex is an estimated vertex of the image of the target object in the second imaging mode, and whose width and height is equal to the width and height of the image of the target object in the first imaging mode or equal to several times as that, or whose width and height is equal to the estimated width and height of the image of the target object in the second imaging mode or equal to several times as that. For example, the searching may be done in a sector area, where the center of the sector is an estimated vertex of the image of the target object in the second imaging mode, and the radius of the sector is equal to the distance between the farthest point from the vertex and the vertex in the image of the target object in the first imaging mode or equal to several times as that, or the radius of the sector is equal to the distance between the estimated farthest point from the vertex and the vertex in the image of the target object in the second imaging mode or equal to several times as that.

Optionally, the method further comprises:

searching for the image of the target object in a second range by a quick searching algorithm; wherein the second range comprises the position of the image of the target object in the second imaging mode and a size of the second range is bigger than a size of a first range. For example, the second range is several times as big as the first range. Or the second range comprises an adjacent area of the position of the image of the target object in the second imaging mode, and the size of the first range comprises a size of the image of the target object in the first imaging mode. Optionally, if in step 103 the image of the target object is not found, the quick searching step is performed, that is to search the second range for the image of the target object by the quick searching algorithm. Also the quick searching step is performed after the image of the target object has been found. The quick searching algorithm may be back propagation algorithm.

Optionally, the second range may include a part or all of the image of the target object in the second imaging mode, and also include the adjacent area of the position of the image of the target object in the second imaging mode; or only include the adjacent area of the position of the image of the target object in the second imaging mode.

Figure 3:
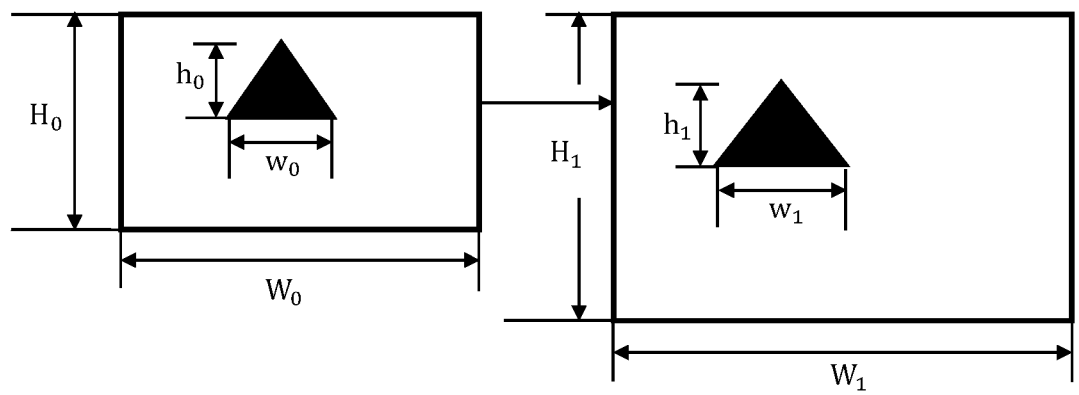
FIG. 3 is an imaging diagram before and after an imaging mode switches provided by the embodiment of the present invention.

Taking the center, width and height of the image of target object as shown in FIG. 3 as an example, the followings is to illustrate how to estimate the position of the image of the target object in the second imaging mode.

The estimating the position of the image of the target object in the second imaging mode comprises: estimating a parameter S of a change of the image size of the target object in the second imaging mode relative to the image size of the target object in the first imaging mode. In the present invention the parameter of the change is measured by a length such as the width and height of the image. A person skilled in the art should understand without inventive efforts the parameter of the change of the image of the target object in different imaging mode can be estimated by a parameter such as an area of the image or an angle of the image, where the altered method should fall in the protection scope of the present invention. For example, the parameter of the change may be ratio of an estimated area of the image of the target object in the second imaging mode to an area of the image of the target object in the first imaging mode, or ratio of an estimated central angle of a sector whose center is a vertex and whose radius is the distance between the farthest point from the vertex and the vertex in the image of the target object in the second imaging mode to a central angle of a sector whose center is a vertex and whose radius is the distance between the farthest point from the vertex and the vertex in the image of the target object in the first imaging mode.

the parameter of the change is s, $$S = \frac{\tan\left(\frac{\theta_0^v}{2}\right) * H_1}{\tan\left(\frac{\theta_1^v}{2}\right) * H_0},$$

wherein $\theta_0^v$ is the field of view in the vertical direction in the first imaging mode, $\theta_1^v$ is the field of view in the vertical direction in the second imaging mode, $H_1$ is the height of the whole image in the second imaging mode, and $H_0$ is the height of the whole image in the first imaging mode; or, the parameter of the change is s, $$S = \frac{\tan\left(\frac{\theta_0^h}{2}\right) * W_1}{\tan\left(\frac{\theta_1^h}{2}\right) * W_0},$$

wherein $\theta_0^h$ is the field of view in the horizontal direction in the first imaging mode, $\theta_1^h$ is the field of view in the horizontal direction in the second imaging mode, $W_0$ is the width of the whole image in the first imaging mode, $W_1$ is the width of the whole image in the second imaging mode.

Optionally, a position of the image of the target object comprises: central point of the image of the target object and/or a size of the image of the target object. Let the position of the image of the target object in the first imaging be $(x_0, y_0)$ (not shown in the figure), the height of the whole image in the first imaging mode be $H_0$, the width of the whole image in the first imaging mode be $W_0$, the height of the whole image in the second imaging mode be $H_1$, the width of the whole image in the second imaging mode be $W_1$, the position of the image of the target object in the second imaging mode comprises: a central location $(x_1, y_1)$ of the image of the target object in the second imaging mode; then, wherein when $$S = \frac{\tan\left(\frac{\theta_0^v}{2}\right) * H_1}{\tan\left(\frac{\theta_1^v}{2}\right) * H_0},$$

the estimating the position of the image of the target object in the second imaging mode according to the resolution in the first imaging mode, the resolution in the second imaging mode, the field of view in the first imaging mode, the field of view in the second imaging mode and the position of the image of the target object in the first imaging mode comprises:

estimating the central location $(x_1, y_1)$ of the image of the target object in the second imaging mode according to the central location $(x_0, y_0)$ of the image of the target object in the first imaging mode, the height $H_0$ of the whole image in the first imaging mode, the width $W_0$ of the whole image in the first imaging mode, the height $H_1$ of the whole image in the second imaging mode and the width $W_1$ of the whole image in the second imaging mode as following:

$$x_1 = \left(x_0 - \frac{W_0}{2}\right) * s + \frac{W_1}{2},$$

$$y_1 = \left(y_0 - \frac{H_0}{2}\right) * s + \frac{H_1}{2}.$$

Optionally, the position of the image of the target object in the first imaging mode further comprises at least one of the following parameters:

a width $w_0$ of the image of the target object in the first imaging mode, and a height $h_0$ of the image of the target object in the first imaging mode;

the position of the image of the target object in the second imaging mode further comprises at least one of the following parameters:

a width $w_1$ of the image of the target object in the second imaging mode, a height $h_1$ of the image of the target object in the second imaging mode; and wherein $$w_1 = w_0 * s,$$

$$h_1 = h_0 * s.$$

Optionally, when $$S = \frac{\tan\left(\frac{\theta_0^h}{2}\right) * W_1}{\tan\left(\frac{\theta_1^h}{2}\right) * W_0},$$

let the position of the image of the target object in the first imaging mode comprises a central location $(x_0, y_0)$ of the image of the target object in the first imaging mode, the position of the image of the target object in the second imaging mode comprises a central location $(x_1, y_1)$ of the image of the target object in the second imaging mode, the resolution in the first imaging mode comprises the height $H_0$ of the whole image in the first imaging mode, and the height $W_0$ of the whole image in the first imaging mode, the resolution in the second imaging mode comprises: the height $H_1$ of the whole image in the second imaging mode, and the width $W_1$ of the whole image in the second imaging mode; and wherein $$x_1 = \left(x_0 - \frac{W_0}{2}\right) * s + \frac{W_1}{2},$$

$$y_1 = \left(y_1 - \frac{H_0}{2}\right) * s + \frac{H_1}{2}.$$

Optionally, the position of the image of the target object in the first imaging mode further comprises at least one of the following parameters:

a width $w_0$ of the image of the target object in the first imaging mode, and a height $h_0$ of the image of the target object in the first imaging mode;

the position of the image of the target object in the second imaging mode further comprises at least one of the following parameters:

a width $w_1$ of the image of the target object in the second imaging mode, a height $h_1$ of the image of the target object in the second imaging mode; and wherein $$w_1 = w_0 * s,$$

$$h_1 = h_0 * s.$$

The method described above enables a terminal with an automatic focusing function not to suspend automatic focus function when different resolutions switches and focus on the image of the target constantly.

The value of S may also be $$\frac{\tan\left(\frac{\theta_0^h}{2}\right)}{\tan\left(\frac{\theta_1^h}{2}\right)}, \frac{\tan\left(\frac{\theta_0^h}{2}\right)}{\tan\left(\frac{\theta_1^h}{2}\right)*W_0}, \frac{\tan\left(\frac{\theta_0^h}{2}\right)*W_1}{\tan\left(\frac{\theta_1^h}{2}\right)}, \frac{W_1}{W_0}, \frac{W_1}{\tan\left(\frac{\theta_1^h}{2}\right)*W_0}, \text{ or}$$

$$\frac{\tan\left(\frac{\theta_0^h}{2}\right)*W_1}{W_0}.$$

A person skilled in the art can understand all the above values of S can express or estimate a change of a size of the image after the imaging mode switches, and the difference between all the above values of S and the value of S described in detail in the embodiment of the present invention is only a constant. So the above values of S can be got by an amendment of the technical solution of the present invention without inventive efforts, and should fall in the protection scope of the present invention.

Accordingly, taking $$S = \frac{\tan\left(\frac{\theta_0^h}{2}\right)}{\tan\left(\frac{\theta_1^h}{2}\right)}$$

for example, the estimated central location $(x_1, y_1)$ of the image of the target object in the second imaging mode is:

$$x_1 = \left(x_0 - \frac{W_0}{2}\right)*s*\frac{W_1}{W_0} + \frac{W_1}{2},$$

$$y_1 = \left(y_1 - \frac{H_0}{2}\right)*s*\frac{W_1}{W_0} + \frac{H_1}{2}.$$

Similarly, the value of S may also be $$\frac{\tan\left(\frac{\theta_0^v}{2}\right)}{\tan\left(\frac{\theta_1^v}{2}\right)}, \frac{\tan\left(\frac{\theta_0^v}{2}\right)}{\tan\left(\frac{\theta_1^v}{2}\right)*H_0}, \frac{\tan\left(\frac{\theta_0^v}{2}\right)*H_1}{\tan\left(\frac{\theta_1^v}{2}\right)}, \frac{H_1}{H_0}, \frac{H_1}{\tan\left(\frac{\theta_1^v}{2}\right)*H_0}, \text{ or}$$

$$\frac{\tan\left(\frac{\theta_0^v}{2}\right)*H_1}{H_0}.$$

A person skilled in the art can understand all the above values of S can express or estimate a change of a size of the image after the imaging mode switches, and the difference between all the above values of S and the value of S described in detail in the embodiment of the present invention is only a constant. So the above values of S can be got by an amendment of the technical solution of the present invention without inventive efforts, and should fall in the protection scope of the present invention. Accordingly, the estimated position of the image of the target object based on the value of S should fall in the protection scope of the present invention. Optionally, the method in the embodiment further comprises:

searching for the image of the target object according to a first algorithm and at least one of the areas of an adjacent area of the position of the image of the target object in the first imaging mode and an adjacent area of the position of the image of the target object in the second imaging mode, wherein the first algorithm comprises at least one of the followings:

an optical flow algorithm, a template matching algorithm, and a correlation filter algorithm.

It can increase stability of searching and tracking when the target object moves a long distance to use the first algorithm to search a part of adjacent areas of the image of the target object in the first and/or second imaging mode to optimize the estimated position of the image of the target object and input the estimated position of the image of the target object into a general searching and tracking algorithm as an initial input, such as mean shift algorithm.

Where generally the steps of the Optical Flow algorithm are:

1. detecting positions of corner features of even distribution in the image area of the target object in the first imaging mode, noted as $\{x_i^0\}$.

2. let $\{x_i^0\}$ be initial position, and track the image of the target object in the second imaging mode from the image of the target object in the first imaging mode to get $\{x_i^1\}$.

3. let $\{x_i^1\}$ be initial position, and track the image of the target object in the first imaging mode from the image of the target object in the second imaging mode to get $\{x_i^2\}$.

4. calculate the distance between $\{x_i^0\}$ and $\{x_i^2\}$, and choose the $\{x_i^1\}$ corresponding to corner feature whose distance is less than median. Small distance means stable tracking. Choose the Median of distance between $\{x_i^0\}$ and $\{x_i^2\}$ as position shift of the image of the target object.

The template matching algorithm includes searching a searching area of the image of the target object in the second imaging mode by a template which is an image block of the image of the target object in the first imaging mode, in which choosing an image block of the same size with pixel by pixel movement and choosing the position of the image block matching best as a new target position.

The main idea of the Correlation Filter algorithm is the same as the template matching algorithm, which includes accelerating the matching algorithm by fast Fourier transform, which is not introduced in detail here.

The method described above enables a picture taking device with automatic focus function not to suspend automatic focus function to focus on the image of the target constantly when different resolutions switch, and maintain focusing on the target constantly even if the target object moves relatively to the picture taking device, so as to increase adaptability to various picture taking mode for a picture taking device to make user interaction decreases and focus on the target object in time, accurately and efficiently to output constant satisfactory images or videos.

Figure 4:
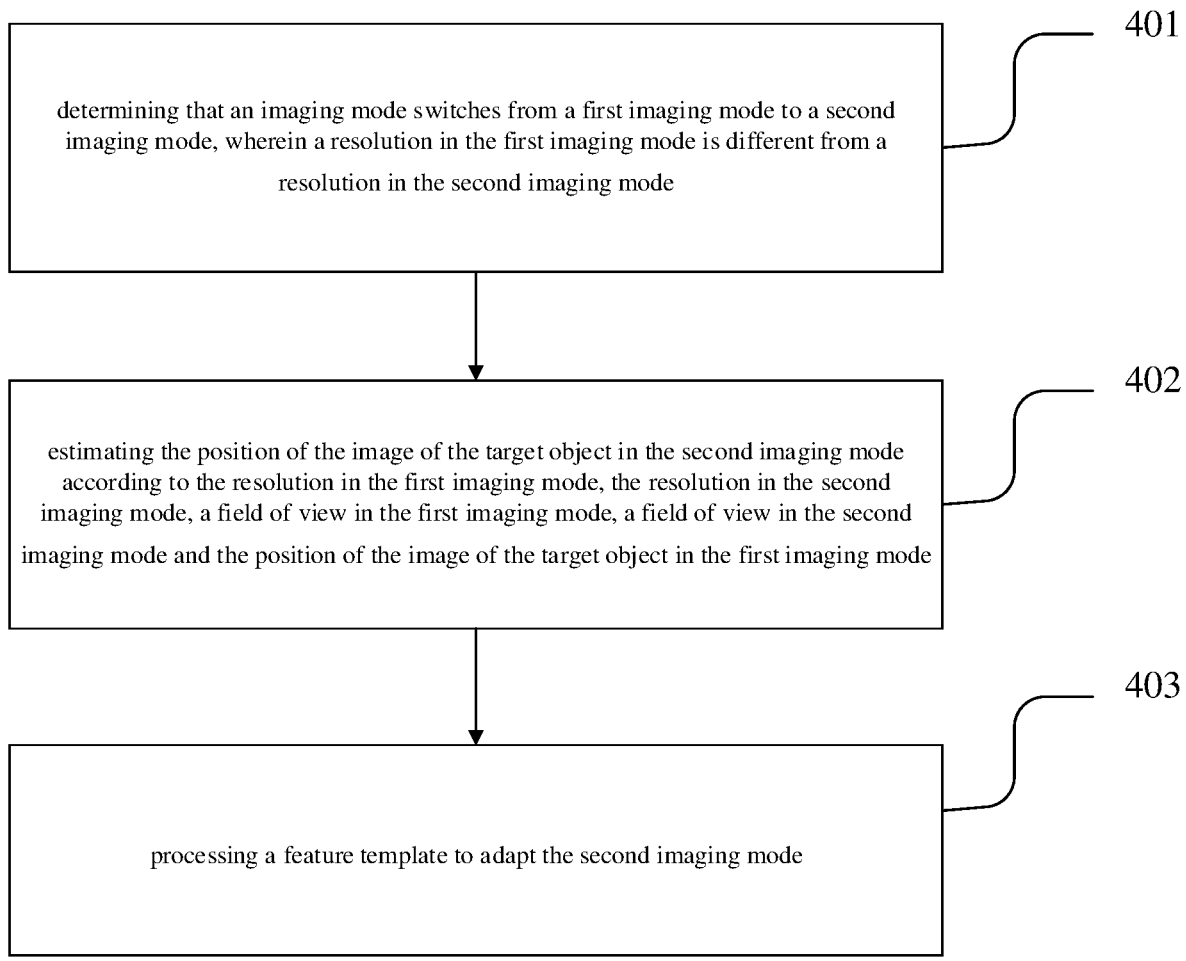
FIG. 4 is a flowchart of another method for focusing provided by the embodiment of the present invention.

As shown in FIG. 4 the followings illustrate a second embodiment of the present invention in detail. The present embodiment is subject to a scenario that is not only the resolution of an image changes, but the image in the first imaging mode is a color image and the image in the second imaging mode is a grey-scale map when the first imaging mode is switched to the second imaging mode. The first imaging mode may be an imaging mode of a color picture taking device, and the second imaging mode may be an imaging mode of a black-and-white picture taking device, as shown in FIG. 4, the method includes:

Step 401, the imaging mode switches from a first imaging mode to a second imaging mode, wherein a position of an image of the target object in the first imaging mode is different from a position of an image of the target object in the second imaging mode. It is caused by one of the following reasons that the position of the image of the target object in the first imaging mode is different from the position of the image of the target object in the second imaging mode: a resolution in the first imaging mode is different from a resolution in the second imaging mode, a field of view in the first imaging mode is different from a field of view in the second imaging mode, a position of the picture taking device in the first imaging mode is different from a position of the picture taking device in the second imaging mode or other reasons. In the present embodiment, the image in the first imaging mode is a color map, and image in the second imaging mode is a grey-scale map. For example, a color map whose resolution is 1440×1080 is switched to a grey-scale map whose resolution is 1440×1280.

Step 402, estimating the position of the image of the target object in the second imaging mode according to a resolution in the first imaging mode, a resolution in the second imaging mode, a field of view in the first imaging mode, a field of view in the second imaging mode and the position of the image of the target object in the first imaging mode;

The detailed implementing way about step 402 may refer to the description in the first embodiment.

Optionally, the method further includes obtaining distance information between the picture taking device and the target object; the picture taking device may be camera, camera head, video shooting device, or scanning device which can obtain depth information, where the depth information is the distance information between the target object and the picture taking device. Then an estimated position of the image of the target object in the second imaging mode is optimized based on the distance information and perspective rules.

Step 403, processing a feature template to adapt the second imaging mode.

The step 403 may include:

obtaining luminance information of a first feature template of the target object in the first imaging mode, making luminance adjustment to the luminance information of the first feature template to obtain a second feature template, wherein the second feature template is used to search for the image of the target object in the second imaging mode. The obtaining luminance information of the first feature template of the target object in the first imaging mode may include changing the first feature template of the target object in the first imaging mode into a grey-scale map, where the grey-scale map be the luminance information of the first feature template. Optionally, the first feature template may be changed into a Lab or a YUV format, where the L channel or Y channel is the luminance information of the first feature template. The luminance adjustment may be completed by color transfer algorithm.

The second feature template is used to search for the image of the target object comprises:

increasing confidence level of a result of searching for the image of the target object by using the feature template irrelative with luminance in the second feature template, or, decreasing confidence level of a result of searching for the image of the target object by using the feature template relative with luminance in the second feature template. The feature irrelative with luminance may be texture feature and so on. In this step, it can increase confidence level of the result of searching for the image of the target object by using the feature template irrelative with luminance to give different weights to the feature template irrelative with luminance and the feature template relative with luminance.

The luminance adjustment method specifically may include:

making luminance adjustment to a first feature template of target object in the first imaging mode according to luminance information of an image of the target object in the first imaging mode and luminance information of an image of the target object in the second imaging mode to obtain a second feature template. The image of the target object may be an image of a part of the target object, or that of the whole target object.

Optionally, the luminance information may be obtained as following: change a format of a grey-scale map or a color map to that of Lab or YUV format which can separate luminance information and color information, where L or Y channel is the luminance information of the grey-scale map or the color map. When processing the luminance information, a channel related to the luminance, such as L or Y channel, can be processed.

Optionally, based on the luminance information, luminance value of the image of the target object in the first imaging mode and luminance value of the image of the target object in the second imaging mode can be counted, respectively noted as $\{H_i^0, i=0 \ldots 255\}$, $\{H_i^1, i=0 \ldots 255\}$.

The making luminance adjustment to the first feature template of target object in the first imaging mode according to luminance information of the image of the target object in the first imaging mode and luminance information of the image of the target object in the second imaging mode to obtain the second feature template comprises:

making luminance adjustment to the first feature template of target object in the first imaging mode to obtain the second feature template according to following information: statistics information of light intensity of pixels of the image of the target object in the first imaging mode and statistics information of light intensity of pixels of the image of the target object in the second imaging mode.

The making luminance adjustment to the first feature template of target object in the first imaging mode to obtain the second feature template according to following information: statistics information of light intensity of pixels of the image of the target object in the first imaging mode and statistics information of light intensity of pixels of the image of the target object in the second imaging mode comprises:

determining corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same as or similar to the statistics information of light intensity of pixels of the image of the target object in the first imaging mode;

making luminance adjustment to the first feature template according to corresponding relationship between the light intensity of pixels of the image of the target object in the first imaging mode and light intensity of pixels of the image of the target object in the first imaging mode to which the luminance adjustment is made to obtain the second feature template.

The determining the corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same to the statistics information of light intensity of pixels of the image of the target object in the first imaging mode comprises:

determining the corresponding relationship between the light intensity of pixels of the image of the target object in the first imaging mode and light intensity of pixels of the image of the target object in the first imaging mode to which the luminance adjustment is made according to following information:

mean value of light intensity of pixels of the image of the target object in the first imaging mode and mean value of light intensity of pixels of the image of the target object in the second imaging mode, and variance of light intensity of pixels of the image of the target object in the first imaging mode and variance of light intensity of pixels of the image of the target object in the second imaging mode; and, wherein mean value of light intensity of pixels of the image of the target object in the first imaging mode to which the luminance adjustment is made is the same as or similar to the mean value of light intensity of pixels of the image of the target object in the first imaging mode, and variance of light intensity of pixels of the image of the target object in the first imaging mode to which the luminance adjustment is made is the same as the variance of light intensity of pixels of the image of the target object in the first imaging mode. Optionally, the mean value may be weighted mean value, and variance may be weighted variance.

The determining corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode comprises:

determining, according to statistics information of light intensity of pixels of the image of the target object in the first imaging mode and statistics information of light intensity of pixels of the image of the target object in the second imaging mode, the light intensity $T[i]$ of pixels of the image of the target object in the first imaging mode to which the luminance adjustment is made:

$$T[i] = (i - M_0) * \frac{V_1}{V_0} + M_1;$$

wherein $M_0$ is mean value of light intensity of pixels of the image of the target object in the first imaging mode, $M_1$ is mean value of light intensity of pixels of the image of the target object in the second imaging mode, $V_0$ is variance of light intensity of pixels of the image of the target object in the first imaging mode, $V_1$ is variance of light intensity of pixels of the image of the target object in the second imaging mode, i is light intensity of pixels of the image of the target object in the first imaging mode.

The making luminance adjustment to the first feature template according to the corresponding relationship between the light intensity of pixels of the image of the target object in the first imaging mode and light intensity of pixels of the image of the target object in the first imaging mode to which the luminance adjustment is made to obtain the second feature template comprises:

obtaining, according to the corresponding relationship between the light intensity of pixels of the image of the target object in the first imaging mode and light intensity of pixels of the image of the target object in the first imaging mode to which the luminance adjustment is made, light intensity $L'(x, y)$ of pixels of the second feature template:

$$L'(x,y)=T[L(x,y)];$$

wherein $L(x, y)$ is light intensity of pixels of the first feature template, $T[i]$ is light intensity of pixels of the image of the target object in the first imaging mode to which the luminance adjustment is made, i is light intensity of pixels of the image of the target object in the first imaging mode.

Optionally, the corresponding relationship may be presented by a mapping table, that is the mapping relationship of i and $T[i]$. The corresponding $T[L(x, y)]$ can be found according to the light intensity $L(x, y)$ of pixels of the first feature template and the mapping relationship, i.e. is the light intensity adjusted of pixels of the first feature template, which is light intensity $L'(x, y)$ of pixels of the second feature template.

The light intensity of pixels comprises value of L channel of the image in Lab format, or value of Y channel of the image in YUV format.

The searching for the image of the target object according to the second feature template in the second imaging mode comprises:

increasing confidence level of a result of searching for the image of the target object by using the feature template irrelative with luminance in the second feature template, and/or, decreasing confidence level of a result of searching for the image of the target object by using the feature template relative with luminance in the second feature template.

The implementing order of the step 402 and step 403 may be upside down. A person skilled in the art this change do not need inventive efforts, and it should fall into protection scope of the present invention that the implementing order of the step 402 and step 403 is upside down.

In the present embodiment, when the imaging mode switches not only the change of resolution is considered but it is considered that the output image is grey-scale map or color map. So it is ensured that the automatic focus function is not suspended, the accuracy of the automatic focus function is increased and responsive time is decreased, adaptability to various scenarios is increased, and user interaction is decreased, so as to focus on the target object in time, accurately and efficiently and output constant satisfactory images or videos.

Figure 5:
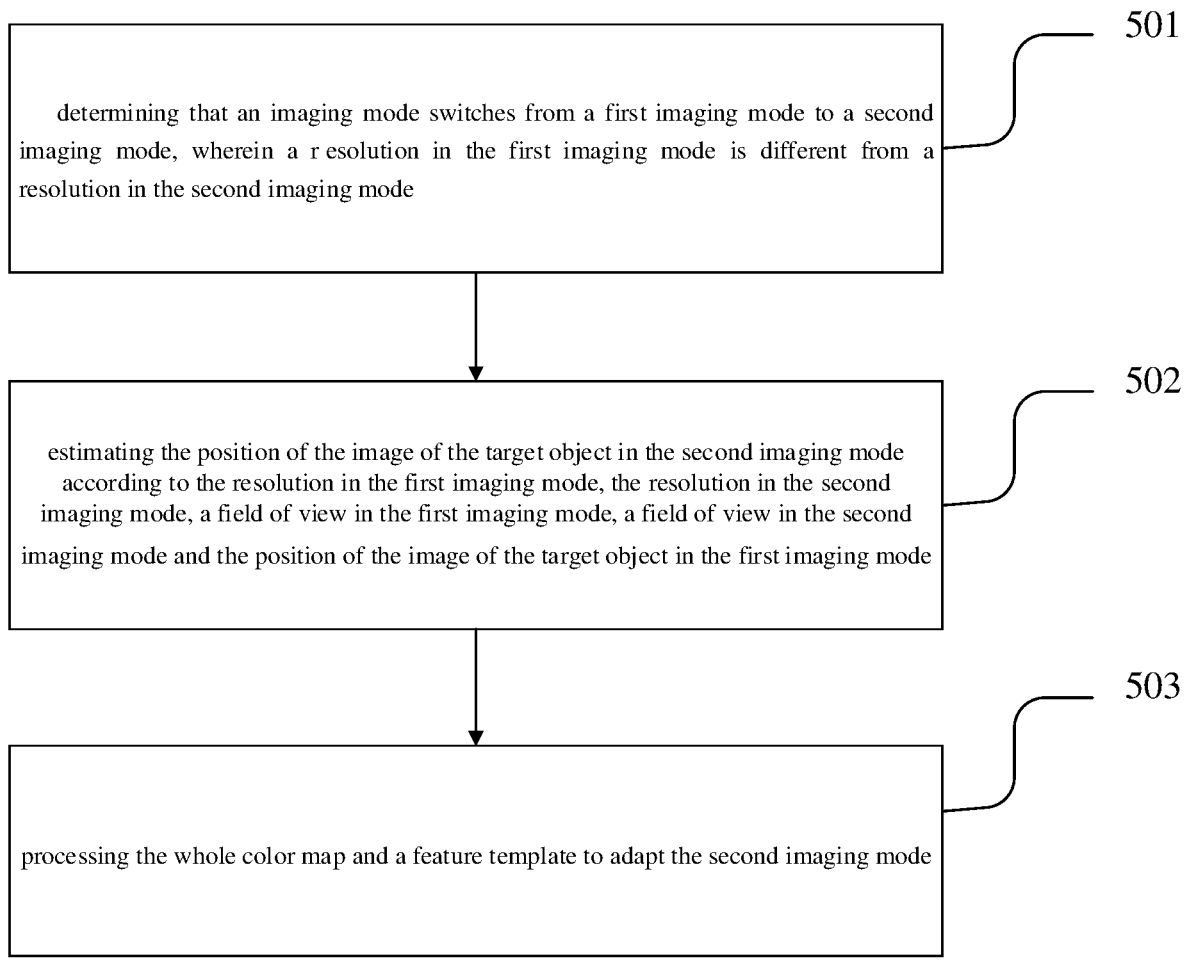
FIG. 5 is a flowchart of another method for focusing provided by the embodiment of the present invention.

As shown in FIG. 5 the followings illustrate a third embodiment of the present invention in detail. The present embodiment is subject to a scenario that is not only the resolution of an image changes, but the image in the first imaging mode is grey-scale map and the image in the second imaging mode is color map when the first imaging mode is switched to the second imaging mode. The first imaging mode may be an imaging mode of a black-and-white picture taking device, and the second imaging mode may be an imaging mode of a color picture taking device, as shown in FIG. 5, the method includes:

Step 501, the imaging mode switches from a first imaging mode to a second imaging mode, wherein a position of an image of the target object in the first imaging mode is different from a position of an image of the target object in the second imaging mode. It is caused by one of the following reasons that the position of the image of the target object in the first imaging mode is different from the position of the image of the target object in the second imaging mode: a resolution in the first imaging mode is different from a resolution in the second imaging mode, a field of view in the first imaging mode is different from a field of view in the second imaging mode, a position of the picture taking device in the first imaging mode is different from a position of the picture taking device in the second imaging mode or other reasons. In the present embodiment, the image in the first imaging mode is a grey-scale map, and image in the second imaging mode is a color map. For example, a grey-scale map whose resolution is 1440×1080 is switched to a color map whose resolution is 1440×1280.

Step 502, estimating the position of the image of the target object in the second imaging mode according to a resolution in the first imaging mode, a resolution in the second imaging mode, a field of view in the first imaging mode, a field of view in the second imaging mode and the position of the image of the target object in the first imaging mode;

The detailed implementing way about step 502 may refer to the description in the first embodiment.

Optionally, the method further includes obtaining distance information between the picture taking device and the target object; the picture taking device may be camera, camera head, video shooting device, or scanning device which can obtain depth information, where the depth information is the distance information between the target object and the picture taking device. Then an estimated position of the image of the target object in the second imaging mode is optimized based on the distance information and perspective rules.

Step 503, processing the whole color map and a feature template to adapt the second imaging mode.

The step 503 may include:

obtaining a grey-scale map of the image of the target object in the second imaging mode, and making luminance adjustment to the first feature template according to the grey-scale map. Optionally, the color image may be changed into the grey-scale map within a period of time, such as 3 seconds. Optionally, the grey-scale map of the image of the target object may be a L channel or Y channel of the image of the target object with a Lab or YUV format;

searching for the image of the target object by the first feature template after the luminance adjustment, wherein the first feature template after the luminance adjustment is added into by a color feature of the image of the target object obtained in the second imaging mode. For example, weighted averages of the first feature and the newly got color feature are counted, so that more color feature is used in searching gradually.

The first feature template after the luminance adjustment and added into by the color feature is used to search for the image of the target object. For example, weighted averages of the first feature and the newly got color feature are counted, so that more color feature is used in searching gradually. The method further includes increasing confidence level of a result of searching for the image of the target object by using the feature template irrelative with luminance in the second feature template. The feature irrelative with luminance may be texture feature and so on. In this step, it can increase confidence level of the result of searching for the image of the target object by using the feature template irrelative with luminance to give different weights to the feature template irrelative with luminance and the feature template relative with luminance.

The luminance adjustment method specifically may include:

making luminance adjustment to a first feature template of target object in the first imaging mode according to luminance information of an image of the target object in the first imaging mode and luminance information of an image of the target object in the second imaging mode to obtain a second feature template.

Optionally, the luminance information may be obtained as following: change a format of a grey-scale map or a color map to that of Lab or YUV format which can separate luminance information and color information, where L or Y channel is the luminance information of the grey-scale map or the color map. When processing the luminance information, a channel related to the luminance, such as L or Y channel, can be processed.

Optionally, based on the luminance information, luminance value of the image of the target object in the first imaging mode and luminance value of the image of the target object in the second imaging mode can be counted, respectively noted as $\{H_i^0, i=0 \ldots 255\}$, $\{H_i^1, i=0 \ldots 255\}$.

The making luminance adjustment to the first feature template of target object in the first imaging mode according to luminance information of the image of the target object in the first imaging mode and luminance information of the image of the target object in the second imaging mode to obtain the second feature template comprises:

making luminance adjustment to the first feature template of target object in the first imaging mode to obtain the second feature template according to following information: statistics information of light intensity of pixels of the image of the target object in the first imaging mode and statistics information of light intensity of pixels of the image of the target object in the second imaging mode.

The making luminance adjustment to the first feature template of target object in the first imaging mode to obtain the second feature template according to following information: statistics information of light intensity of pixels of the image of the target object in the first imaging mode and statistics information of light intensity of pixels of the image of the target object in the second imaging mode comprises:

determining corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same as or similar to the statistics information of light intensity of pixels of the image of the target object in the first imaging mode;

making luminance adjustment to the first feature template according to corresponding relationship between the light intensity of pixels of the image of the target object in the first imaging mode and light intensity of pixels of the image of the target object in the first imaging mode to which the luminance adjustment is made to obtain the second feature template.

The determining the corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same to the statistics information of light intensity of pixels of the image of the target object in the first imaging mode comprises:

determining the corresponding relationship between the light intensity of pixels of the image of the target object in the first imaging mode and light intensity of pixels of the image of the target object in the first imaging mode to which the luminance adjustment is made according to following information:

mean value of light intensity of pixels of the image of the target object in the first imaging mode and mean value of light intensity of pixels of the image of the target object in the second imaging mode, and variance of light intensity of pixels of the image of the target object in the first imaging mode and variance of light intensity of pixels of the image of the target object in the second imaging mode; and, wherein mean value of light intensity of pixels of the image of the target object in the first imaging mode to which the luminance adjustment is made is the same as or similar to the mean value of light intensity of pixels of the image of the target object in the first imaging mode, and variance of light intensity of pixels of the image of the target object in the first imaging mode to which the luminance adjustment is made is the same as the variance of light intensity of pixels of the image of the target object in the first imaging mode. Optionally, the mean value may be weighted mean value, and variance may be weighted variance.

The determining corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode comprises:

determining, according to statistics information of light intensity of pixels of the image of the target object in the first imaging mode and statistics information of light intensity of pixels of the image of the target object in the second imaging mode, the light intensity $T[i]$ of pixels of the image of the target object in the first imaging mode to which the luminance adjustment is made:

$$T[i] = (i - M_0) * \frac{V_1}{V_0} + M_1;$$

wherein $M_0$ is mean value of light intensity of pixels of the image of the target object in the first imaging mode, $M_1$ is mean value of light intensity of pixels of the image of the target object in the second imaging mode, $V_0$ is variance of light intensity of pixels of the image of the target object in the first imaging mode, $V_1$ is variance of light intensity of pixels of the image of the target object in the second imaging mode, i is light intensity of pixels of the image of the target object in the first imaging mode.

The making luminance adjustment to the first feature template according to the corresponding relationship between the light intensity of pixels of the image of the target object in the first imaging mode and light intensity of pixels of the image of the target object in the first imaging mode to which the luminance adjustment is made to obtain the second feature template comprises:

obtaining, according to the corresponding relationship between the light intensity of pixels of the image of the target object in the first imaging mode and light intensity of pixels of the image of the target object in the first imaging mode to which the luminance adjustment is made, light intensity $L'(x, y)$ of pixels of the second feature template:

$L'(x,y)=T[L(x,y)]$;

wherein $L(x, y)$ is light intensity of pixels of the first feature template, $T[i]$ is light intensity of pixels of the image of the target object in the first imaging mode to which the luminance adjustment is made, i is light intensity of pixels of the image of the target object in the first imaging mode.

Optionally, the corresponding relationship may be presented by a mapping table, that is the mapping relationship of i and $T[i]$. The corresponding $T[L(x, y)]$ can be found according to the light intensity $L(x, y)$ of pixels of the first feature template and the mapping relationship, i.e. is the light intensity adjusted of pixels of the first feature template, which is light intensity $L'(x, y)$ of pixels of the second feature template.

The light intensity of pixels comprises value of L channel of the image in Lab format, or value of Y channel of the image in YUV format.

The searching for the image of the target object according to the second feature template in the second imaging mode comprises:

increasing confidence level of a result of searching for the image of the target object by using the feature template irrelative with luminance in the second feature template, and/or, decreasing confidence level of a result of searching for the image of the target object by using the feature template relative with luminance in the second feature template.

The implementing order of the step 502 and step 503 may be upside down. A person skilled in the art can understand this change do not need inventive efforts, and it should fall into protection scope of the present invention that the implementing order of the step 502 and step 503 is upside down.

In the present embodiment, when the imaging mode switches not only the change of resolution is considered but it is considered that the output image is grey-scale map or color map. So it is ensured that the automatic focus function is not suspended, the accuracy of the automatic focus function is increased and responsive time is decreased, adaptability to various scenarios is increased, and user interaction is decreased, so as to focus on the target object in time, accurately and efficiently and output constant satisfactory images or videos.

Figure 6:
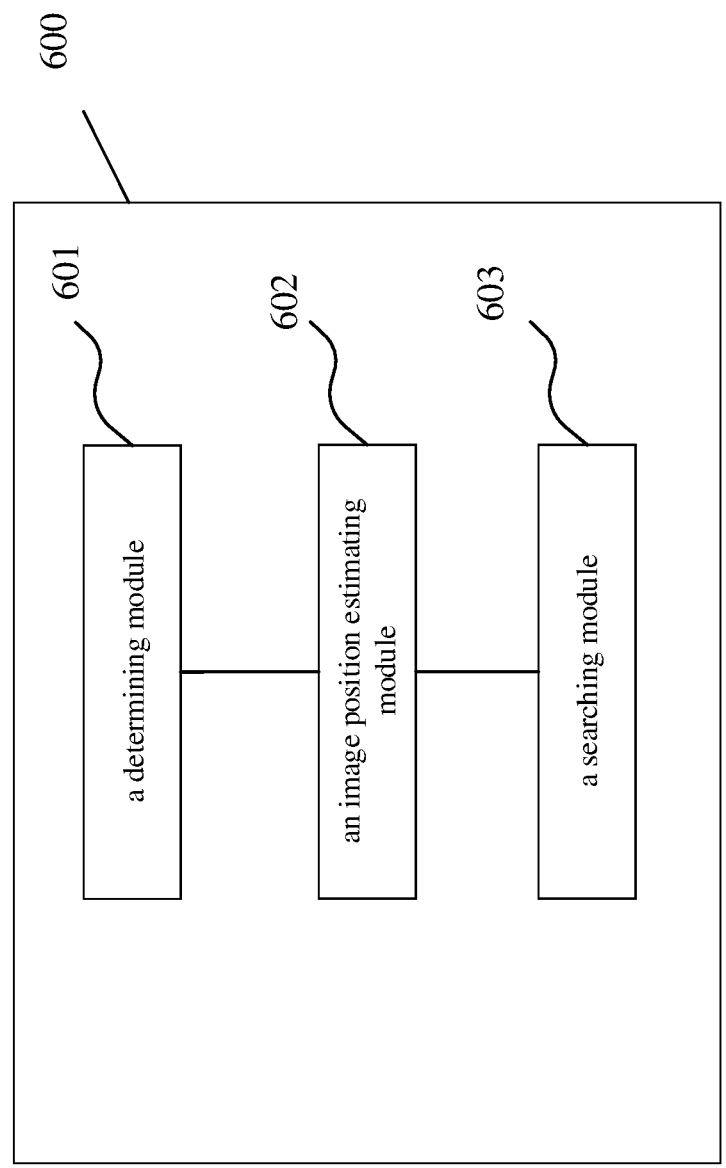
FIG. 6 is a structural diagram of an apparatus for focusing provided by the embodiment of the present invention.

As shown in FIG. 6 the followings illustrate a third embodiment of the present invention in detail. As shown in FIG. 6, the embodiment of the present invention provides an apparatus 600 for focusing, where the apparatus 600 includes:

a determining module 601, configured to determine that an imaging mode switches from a first imaging mode to a second imaging mode, wherein a position of an image of a target object in the first imaging mode is different from a position of an image of the target object in the second imaging mode;

That the imaging mode switches from the first imaging mode to the second imaging mode may only include a switch of resolution, or include a switch of combination of multiple imaging modes including the switch of resolution. For example, a switch from a grey-scale map whose resolution is 1440×1080 to a color map whose resolution is 800×600, where the first imaging mode may be a mode of a grey-scale picture taking device and the second imaging mode may be a mode of a color picture taking device or different imaging mode of the same picture taking device, or in another example a switch from a color map whose resolution is 1440×1080 to a grey-scale map whose resolution is 1440×1280, where the first imaging mode may be a mode of a color picture taking device and the second imaging mode may be a mode of a black-and-white picture taking device or different imaging mode of the same picture taking device.

an image position estimating module 602, configured to estimate the position of the image of the target object in the second imaging mode according to a resolution in the first imaging mode, a resolution in the second imaging mode, a field of view in the first imaging mode, a field of view in the second imaging mode and the position of the image of the target object in the first imaging mode; and The field of view (FoV) may include horizontal field of view or vertical field of view.

The position of the image may include a character point representing position of the image of the target object and a size of the image. For example, the point may be a central point or a vertex of the target object or a central point or a vertex of a circumscribed graph (such as circumscribed rectangle or circumcircle), the size of the image may be a width or a height of image of the target object, or the size of the circumscribed graph (such as circumscribed rectangle or circumcircle), such as a width or a height of the circumscribed graph, or a radius or a diameter of the circumcircle. A person skilled in the art should understand the position of the image may be measured by other ways, such as any point of the image of the target object or any point relative to the position of image of the target object. The difference between the position determined by this measuring way and the position of the central point is only a constant vector, which may be acquired or nearly acquired through an amendment from the method disclosed by the present invention without an effort of innovation by a person skilled in the art, and the amended method should be within the protection scope of the present invention.

Similarly, a person skilled in the art should understand that the size of the image may include the size of geometry of the image of the target object. For example, the size of the image may be a width and a height of the image of the target object (a width and a height of the circumscribed rectangle), as shown in W and H in FIG. 2, where 201 represent the image of the target object. The size of the image of the target object may also be a value which is slightly bigger than the width and the height of the image of the target object, such as 1.2 times as wide or high as the width and the height of the image of the target object. It may also be a central point which is one of vertexes of the image of the target object, and a radius and central angle of a sector which covers the whole image of the target object. It may also be a radius or a diameter of circumcircle of the image of the target object. A person skilled in the art should understand the above various expressions on the size of the image may be acquired or nearly acquired through an amendment from the method disclosed by the present invention without an effort of innovation by a person skilled in the art (circumscribed graphs can be got by each other, and the sector can be got by only a change of coordinate system), and the amended method should be within the protection scope of the present invention.

a searching module 603, configured to search for the image of the target object in the second imaging mode according to the estimated position of the image of the target object in the second imaging mode estimated by image position estimating module.

Cause generally a picture taking device has a digital image stabilization (DIS) module, the output image is cut, which may influence the accuracy of estimated position of the image of the target object. So the image of the target object may be searched for in a larger area, such as two times as big as the area of the image of target object after switching to the second imaging mode.

The searching module 603 specifically configured to determine a searching area by the estimated character point representing position of the image of the target object and the size of the image in the second imaging mode, such as searching in a rectangle area whose central point is the estimated central point of the image of the target object in the second imaging mode and whose width and height is the estimated width and height of the image of the target object in the second imaging mode or several times as that, or the width and height of the image of the target object in the first imaging mode or several times as that. For example, the searching may be done in a round area, whose central point is the estimated central point of the image of the target object in the second imaging mode and whose radius is equal to a radius of the circumcircle of the image of the target object in the second imaging mode or equal to several times as that. For example, the searching may be done in a round area, whose central point is the estimated central point of the image of the target object in the second imaging mode and whose radius is equal to a radius of the circumcircle of the image of the target object in the first imaging mode or equal to several times as that. For example, the searching may be done in a rectangle area, whose width and height is equal to the width and height of the image of the target object in the first imaging mode or equal to several times as that, or whose width and height is equal to the estimated width and height of the image of the target object in the second imaging mode or equal to several times as that. For example, the searching may be done in a rectangle area, whose vertex is an estimated vertex of the image of the target object in the second imaging mode, and whose width and height is equal to the width and height of the image of the target object in the first imaging mode or equal to several times as that, or whose width and height is equal to the estimated width and height of the image of the target object in the second imaging mode or equal to several times as that. For example, the searching may be done in a sector area, where the center of the sector is an estimated vertex of the image of the target object in the second imaging mode, and the radius of the sector is equal to the distance between the farthest point from the vertex and the vertex in the image of the target object in the first imaging mode or equal to several times as that, or the radius of the sector is equal to the distance between the estimated farthest point from the vertex and the vertex in the image of the target object in the second imaging mode or equal to several times as that.

The searching module 603 is further configured to search for the image of the target object in a second range by a quick searching algorithm;

wherein the second range comprises the position of the image of the target object in the second imaging mode and a size of the second range is bigger than a size of a first range. For example, the second range is several times as big as the first range. Or the second range comprises an adjacent area of the position of the image of the target object in the second imaging mode, and the size of the first range comprises a size of the image of the target object in the first imaging mode.

Optionally, if the searching module 603 fails to find the image of the target object, the quick searching step is performed, that is to search the second range for the image of the target object by the quick searching algorithm. Also the quick searching step is performed after the image of the target object has been found. The quick searching algorithm may be back propagation algorithm.

Optionally, the second range may include a part or all of the image of the target object in the second imaging mode, and also include the adjacent area of the position of the image of the target object in the second imaging mode; or only include the adjacent area of the position of the image of the target object in the second imaging mode.

Taking the center, width and height of the image of target object as shown in FIG. 3 as an example, the followings is to illustrate how the image position estimating module 602 estimates the position of the image of the target object in the second imaging mode.

The image position estimating module 602 is specifically configured to estimate a parameter of a change of the image size of the target object in the second imaging mode relative to the image size of the target object in the first imaging mode according to a height of the whole image in the first imaging mode, a height of the whole image in the second imaging mode, the field of view in the vertical direction in the first imaging mode and the field of view in the vertical direction in the second imaging mode.

In the present invention the parameter of the change is measured by a length such as the width and height of the image. A person skilled in the art should understand without inventive efforts the parameter of the change of the image of the target object in different imaging mode can be estimated by a parameter such as an area of the image or an angle of the image, where the altered method should fall in the protection scope of the present invention. For example, the parameter of the change may be ratio of an estimated area of the image of the target object in the second imaging mode to an area of the image of the target object in the first imaging mode, or ratio of an estimated central angle of a sector whose center is a vertex and whose radius is the distance between the farthest point from the vertex and the vertex in the image of the target object in the second imaging mode to a central angle of a sector whose center is a vertex and whose radius is the distance between the farthest point from the vertex and the vertex in the image of the target object in the first imaging mode.

The image position estimating module 602 is specifically configured to calculate the parameter of the change s, wherein $$s = \frac{\tan\left(\frac{\theta_0^v}{2}\right) * H_1}{\tan\left(\frac{\theta_1^v}{2}\right) * H_0},$$

and $\theta_0^v$ is the field of view in the vertical direction in the first imaging mode, $\theta_1^v$ is the field of view in the vertical direction in the second imaging mode, $H_1$ is the height of the whole image in the second imaging mode, and $H_0$ is the height of the whole image in the first imaging mode.

Optionally, a position of the image of the target object comprises: central point of the image of the target object and/or a size of the image of the target object. Let the position of the image of the target object in the first imaging be $(x_0, y_0)$ (not shown in the figure), the height of the whole image in the first imaging mode be $H_0$, the height of the whole image in the first imaging mode be $W_0$, the height of the whole image in the second imaging mode be $H_1$, the width of the whole image in the second imaging mode be $W_1$, the position of the image of the target object in the second imaging mode comprises: a central location $(x_1, y_1)$ of the image of the target object in the second imaging mode;

The image position estimating module 602 is specifically configured to estimate the central location $(x_1, y_1)$ of the image of the target object in the second imaging mode according to the central location $(x_0, y_0)$ of the image of the target object in the first imaging mode, the height $H_0$ of the whole image in the first imaging mode, the height $W_0$ of the whole image in the first imaging mode, the height $H_1$ of the whole image in the second imaging mode and the width $W_1$ of the whole image in the second imaging mode as following:

$$x_1 = \left(x_0 - \frac{W_0}{2}\right) * s + \frac{W_1}{2},$$

$$y_1 = \left(y_1 - \frac{H_0}{2}\right) * s + \frac{H_1}{2}.$$

The position of the image of the target object in the first imaging mode further comprises at least one of the following parameters:

a width $w_0$ of the image of the target object in the first imaging mode, and a height $h_0$ of the image of the target object in the first imaging mode;

the position of the image of the target object in the second imaging mode further comprises at least one of the following parameters:

a width $w_1$ of the image of the target object in the second imaging mode, a height $h_1$ of the image of the target object in the second imaging mode; and the image position estimating module 602 is further configured to calculate the width $w_1$ of the image of the target object in the second imaging mode, and the height $h_1$ of the image of the target object in the second imaging mode as following:

$$w_1 = w_0 * s,$$

$$h_1 = h_0 * s.$$

The image position estimating module 602 is specifically configured to calculate the parameter of the change s, wherein $$s = \frac{\tan\left(\frac{\theta_0^h}{2}\right) * W_1}{\tan\left(\frac{\theta_1^h}{2}\right) * W_0},$$

and $\theta_0^h$ is the field of view in the horizontal direction in the first imaging mode, $\theta_1^h$ is the field of view in the horizontal direction in the second imaging mode, $W_0$ is the height of the whole image in the first imaging mode, $W_1$ is the width of the whole image in the second imaging mode.

The position of the image of the target object in the first imaging mode comprises: a central location $(x_0, y_0)$ of the image of the target object in the first imaging mode; the resolution in the first imaging mode comprises: the height $H_0$ of the whole image in the first imaging mode, and the height $W_0$ of the whole image in the first imaging mode; the resolution in the second imaging mode comprises: the height $H_1$ of the whole image in the second imaging mode, and the width $W_1$ of the whole image in the second imaging mode; the position of the image of the target object in the second imaging mode comprises: a central location $(x_1, y_1)$ of the image of the target object in the second imaging mode; and the image position estimating module 602 is specifically configured to estimate the central location $(x_1, y_1)$ of the image of the target object in the second imaging mode according to the central location $(x_0, y_0)$ of the image of the target object in the first imaging mode, the height $H_0$ of the whole image in the first imaging mode, the height $W_0$ of the whole image in the first imaging mode, the height $H_1$ of the whole image in the second imaging mode and the width $W_1$ of the whole image in the second imaging mode as following:

$$x_1 = \left(x_0 - \frac{W_0}{2}\right) * s + \frac{W_1}{2},$$

$$y_1 = \left(y_1 - \frac{H_0}{2}\right) * s + \frac{H_1}{2}.$$

The position of the image of the target object in the first imaging mode further comprises at least one of the following parameters:

a width $w_0$ of the image of the target object in the first imaging mode, and a height $h_0$ of the image of the target object in the first imaging mode;

the position of the image of the target object in the second imaging mode further comprises at least one of the following parameters:

a width $w_1$ of the image of the target object in the second imaging mode, a height $h_1$ of the image of the target object in the second imaging mode; and the image position estimating module 602 is further configured to calculate the width $w_1$ of the image of the target object in the second imaging mode, and the height $h_1$ of the image of the target object in the second imaging mode as following:

$$w_1 = w_0 * s,$$

$$h_1 = h_0 * s.$$

The value of S may also be $$\frac{\tan\left(\frac{\theta_0^h}{2}\right)}{\tan\left(\frac{\theta_1^h}{2}\right)}, \frac{\tan\left(\frac{\theta_0^h}{2}\right)}{\tan\left(\frac{\theta_1^h}{2}\right) * W_0}, \frac{\tan\left(\frac{\theta_0^h}{2}\right) * W_1}{\tan\left(\frac{\theta_1^h}{2}\right)}, \frac{W_1}{W_0}, \frac{W_1}{\tan\left(\frac{\theta_1^h}{2}\right) * W_0},$$

or $\frac{\tan\left(\frac{\theta_0^h}{2}\right) * W_1}{W_0}$.

A person skilled in the art can understand all the above values of S can express or estimate a change of a size of the image after the imaging mode switches, and the difference between all the above values of S and the value of S described in detail in the embodiment of the present invention is only a constant. So the above values of S can be got by an amendment of the technical solution of the present invention without inventive efforts, and should fall in the protection scope of the present invention.

Accordingly, taking $$S = \frac{\tan\left(\frac{\theta_0^h}{2}\right)}{\tan\left(\frac{\theta_1^h}{2}\right)}$$

for example, the estimated central location $(x_1, y_1)$ of the image of the target object in the second imaging mode is:

$$x_1 = \left(x_0 - \frac{W_0}{2}\right) * s * \frac{W_1}{W_0} + \frac{W_1}{2},$$

$$y_1 = \left(y_1 - \frac{H_0}{2}\right) * s * \frac{W_1}{W_0} + \frac{H_1}{2}.$$

Accordingly, the estimated size of the image of the target object in the second imaging mode, that is width and height, is:

$$w_1 = w_0 * s * \frac{W_1}{W_0},$$

$$h_1 = h_0 * s * \frac{W_1}{W_0}.$$

Similarly, the value of S may also be $$\frac{\tan\left(\frac{\theta_0^v}{2}\right)}{\tan\left(\frac{\theta_1^v}{2}\right)}, \frac{\tan\left(\frac{\theta_0^v}{2}\right)}{\tan\left(\frac{\theta_1^v}{2}\right) * H_0}, \frac{\tan\left(\frac{\theta_0^v}{2}\right) * H_1}{\tan\left(\frac{\theta_1^v}{2}\right)}, \frac{H_1}{H_0}, \frac{H_1}{\tan\left(\frac{\theta_1^v}{2}\right) * H_0},$$

or $\frac{\tan\left(\frac{\theta_0^v}{2}\right) * H_1}{H_0}$.

A person skilled in the art can understand all the above values of S can express or estimate a change of a size of the image after the imaging mode switches, and the difference between all the above values of S and the value of S described in detail in the embodiment of the present invention is only a constant. So the above values of S can be got by an amendment of the technical solution of the present invention without inventive efforts, and should fall in the protection scope of the present invention. Accordingly, the estimated position of the image of the target object based on the value of S should fall in the protection scope of the present invention.

The apparatus further comprises a determining module 600, and the determining module is configured to search for the image of the target object according to a first algorithm and at least one of the areas of an adjacent area of the position of the image of the target object in the first imaging mode and an adjacent area of the position of the image of the target object in the second imaging mode, wherein the first algorithm comprises at least one of the followings:

an optical flow algorithm, a template matching algorithm, and a correlation filter algorithm.

It can increase stability of searching and tracking when the target object moves a long distance to use the first algorithm to search a part of adjacent areas of the image of the target object in the first and/or second imaging mode to optimize the estimated position of the image of the target object and input the estimated position of the image of the target object into a general searching and tracking algorithm as an initial input, such as mean shift algorithm.

Where generally the steps of the Optical Flow algorithm are:

1. detecting positions of corner features of even distribution in the image area of the target object in the first imaging mode, noted as $\{x_i^0\}$.

2. let $\{x_1^0\}$ be initial position, and track the image of the target object in the second imaging mode from the image of the target object in the first imaging mode to get $\{x_i^1\}$.

3. let $\{x_i^1\}$ be initial position, and track the image of the target object in the first imaging mode from the image of the target object in the second imaging mode to get $\{x_i^2\}$.

4. calculate the distance between $\{x_i^0\}$ and $\{x_i^2\}$, and choose the $\{x_i^1\}$ corresponding to corner feature whose distance is less than median. Small distance means stable tracking. Choose the Median of distance between $\{x_i^0\}$ and $\{x_i^2\}$ as position shift of the image of the target object.

The template matching algorithm includes searching a searching area of the image of the target object in the second imaging mode by a template which is an image block of the image of the target object in the first imaging mode, in which choosing an image block of the same size with pixel by pixel movement and choosing the position of the image block matching best as a new target position.

The main idea of the Correlation Filter algorithm is the same as the template matching algorithm, which includes accelerating the matching algorithm by fast Fourier transform, which is not introduced in detail here.

The method described above enables a picture taking device with automatic focus function not to suspend automatic focus function to focus on the image of the target constantly when different resolutions switch, and maintain focusing on the target constantly even if the target object moves relatively to the picture taking device, so as to increase adaptability to various picture taking mode for a picture taking device to make user interaction decreases and focus on the target object in time, accurately and efficiently to output constant satisfactory images or videos.

Optionally, the apparatus 600 further comprises an obtaining module, and the obtaining module is configured to obtain distance information from the target object to a picture taking device in the second imaging mode; and the image position estimating module is further configured to optimize the estimated position of the image of the target object in the second imaging mode according to the distance information and rules of perspective obtained by the obtaining module.

Optionally, as for the apparatus 600 when the first imaging mode is switched to the second imaging mode not only the resolution of an image changes, but the image in the first imaging mode is a color image and the image in the second imaging mode is a grey-scale map. For example, a color map whose resolution is 1440×1080 is switched to a grey-scale map whose resolution is 1440×1280. The apparatus 600 further includes an obtaining module and a luminance adjusting module, The obtaining module is configured to obtain luminance information of a first feature template of the target object in the first imaging mode; the luminance information of the first feature template may include: changing the first feature template of the target object in the first imaging mode into a grey-scale map, where the grey-scale map be the luminance information of the first feature template. Optionally, the first feature template may be changed into a Lab or a YUV format, where the L channel or Y channel is the luminance information of the first feature template.

The luminance adjusting module is configured to make luminance adjustment to the luminance information of the first feature template to obtain a second feature template; the luminance adjustment may be completed by color transfer algorithm.

The searching module 603 is further configured to search for the image of the target object in the second imaging mode by the second feature template.

the searching module 603 is further configured to increase confidence level of a result of searching for the image of the target object by using the feature template irrelative with luminance in the second feature template, or, decrease confidence level of a result of searching for the image of the target object by using the feature template relative with luminance in the second feature template. The feature irrelative with luminance may be texture feature and so on. In this step, it can increase confidence level of the result of searching for the image of the target object by using the feature template irrelative with luminance to give different weights to the feature template irrelative with luminance and the feature template relative with luminance.

The implementing order of the function of the luminance adjusting module and the image position estimating module 602 may be upside down. A person skilled in the art this change do not need inventive efforts, and it should fall into protection scope of the present invention that the implementing order of the function of the luminance adjusting module and the image position estimating module 602 is upside down.

Optionally, the luminance adjustment module is specifically configured to:

make luminance adjustment to a first feature template of target object in the first imaging mode according to luminance information of an image of the target object in the first imaging mode and luminance information of an image of the target object in the second imaging mode to obtain a second feature template. Optionally, the luminance information may be obtained as following: change a format of a grey-scale map or a color map to that of Lab or YUV format which can separate luminance information and color information, where L or Y channel is the luminance information of the grey-scale map or the color map. When processing the luminance information, a channel related to the luminance, such as L or Y channel, can be processed.

Optionally, the luminance adjustment module is further configured to count luminance value of the image of the target object in the first imaging mode and luminance value of the image of the target object in the second imaging mode, respectively noted as $\{H_i^0, i=0 \ldots 255\}$, $\{H_i^1, i=0 \ldots 255\}$ based on the luminance information.

The luminance adjustment module is specifically configured to make luminance adjustment to the first feature template of target object in the first imaging mode to obtain the second feature template according to following information:

statistics information of light intensity of pixels of the image of the target object in the first imaging mode and statistics information of light intensity of pixels of the image of the target object in the second imaging mode.

The luminance adjustment module is specifically configured to determine corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same as or similar to the statistics information of light intensity of pixels of the image of the target object in the first imaging mode;

make luminance adjustment to the first feature template according to corresponding relationship between the light intensity of pixels of the image of the target object in the first imaging mode and light intensity of pixels of the image of the target object in the first imaging mode to which the luminance adjustment is made to obtain the second feature template.

The luminance adjustment module is specifically configured to determine the corresponding relationship between the light intensity of pixels of the image of the target object in the first imaging mode and light intensity of pixels of the image of the target object in the first imaging mode to which the luminance adjustment is made according to following information:

mean value of light intensity of pixels of the image of the target object in the first imaging mode and mean value of light intensity of pixels of the image of the target object in the second imaging mode, and variance of light intensity of pixels of the image of the target object in the first imaging mode and variance of light intensity of pixels of the image of the target object in the second imaging mode; and, wherein mean value of light intensity of pixels of the image of the target object in the first imaging mode to which the luminance adjustment is made is the same as or similar to the mean value of light intensity of pixels of the image of the target object in the first imaging mode, and variance of light intensity of pixels of the image of the target object in the first imaging mode to which the luminance adjustment is made is the same as the variance of light intensity of pixels of the image of the target object in the first imaging mode. Optionally, the mean value may be weighted mean value, and variance may be weighted variance.

The luminance adjustment module is specifically configured to determine, according to statistics information of light intensity of pixels of the image of the target object in the first imaging mode and statistics information of light intensity of pixels of the image of the target object in the second imaging mode, the light intensity T [i] of pixels of the image of the target object in the first imaging mode to which the luminance adjustment is made:

$$T[i] = (i - M_0) * \frac{V_1}{V_0} + M_1;$$

wherein $M_0$ is mean value of light intensity of pixels of the image of the target object in the first imaging mode, $M_1$ is mean value of light intensity of pixels of the image of the target object in the second imaging mode, $V_0$ is variance of light intensity of pixels of the image of the target object in the first imaging mode, $V_1$ is variance of light intensity of pixels of the image of the target object in the second imaging mode, i is light intensity of pixels of the image of the target object in the first imaging mode.

The luminance adjustment module is specifically configured to obtain, according to the corresponding relationship between the light intensity of pixels of the image of the target object in the first imaging mode and light intensity of pixels of the image of the target object in the first imaging mode to which the luminance adjustment is made, light intensity L'(x, y) of pixels of the second feature template:

$$L'(x,y)=T[L(x,y)];$$

wherein L(x, y) is light intensity of pixels of the first feature template, T[i] is light intensity of pixels of the image of the target object in the first imaging mode to which the luminance adjustment is made, i is light intensity of pixels of the image of the target object in the first imaging mode.

The searching module 603 is specifically configured to increase confidence level of a result of searching for the image of the target object by using the feature template irrelative with luminance in the second feature template, and/or, decrease confidence level of a result of searching for the image of the target object by using the feature template relative with luminance in the second feature template.

The searching module 603 is further configured to search for the image of the target object by using the first feature template after a period of time.

In the present embodiment, when the imaging mode switches not only the change of resolution is considered but it is considered that the output image is grey-scale map or color map. So it is ensured that the automatic focus function is not suspended, the accuracy of the automatic focus function is increased and responsive time is decreased, adaptability to various scenarios is increased, adaptability to various picture taking modes for a picture taking device is increased, and user interaction is decreased, so as to focus on the target object in time, accurately and efficiently and output constant satisfactory images or videos.

Optionally, the apparatus 600 is subject to a scenario that is when the first imaging mode is switched to the second imaging mode, not only a resolution of the image changes, but the image in the first imaging mode is a grey-scale map, and image in the second imaging mode is a color map. For example, a grey-scale map whose resolution is 1440×1080 is switched to a color map whose resolution is 1440×1280. The apparatus 600 further comprises a color image processing module and a color feature adding module.

the color image processing module is configured to obtain a grey-scale map of the image of the target object in the second imaging mode, and making luminance adjustment to the first feature template according to the grey-scale map. Optionally, the color image may be changed into the grey-scale map within a period of time, such as 3 seconds. Optionally, the grey-scale map of the image of the target object may be a L channel or Y channel of the image of the target object with a Lab or YUV format.

The color feature adding module is configured to search for the image of the target object by the first feature template after the luminance adjustment, wherein the first feature template after the luminance adjustment is added into by a color feature of the image of the target object obtained in the second imaging mode; For example, weighted averages of the first feature and the newly got color feature are counted, so that more color feature is used in searching gradually.

The searching module 603 is further configured to search for the image of the target object by the first feature template after the luminance adjustment and added into by the color feature. The searching module 603 is further configured to increase confidence level of a result of searching for the image of the target object by using the feature template irrelative with luminance in the second feature template. The feature irrelative with luminance may be texture feature and so on. In this step, it can increase confidence level of the result of searching for the image of the target object by using the feature template irrelative with luminance to give different weights to the feature template irrelative with luminance and the feature template relative with luminance.

The implementing order of the function of the color image processing module, the function of the color feature adding module and the function of the image position estimating module 602 may be upside down. A person skilled in the art can understand this change do not need inventive efforts, and it should fall into protection scope of the present invention that the implementing order of the function of the color image processing module, the function of the color feature adding module and the function of the image position estimating module 602 is upside down.

The color image processing module is specifically configured to:
make luminance adjustment to a first feature template of target object in the first imaging mode according to luminance information of an image of the target object in the first imaging mode and luminance information of an image of the target object in the second imaging mode to obtain a second feature template.

Optionally, the luminance information may be obtained as following: change a format of a grey-scale map or a color map to that of Lab or YUV format which can separate luminance information and color information, where L or Y channel is the luminance information of the grey-scale map or the color map. When processing the luminance information, a channel related to the luminance, such as L or Y channel, can be processed.

Optionally, the color image processing module is further configured to: count luminance value of the image of the target object in the first imaging mode and luminance value of the image of the target object in the second imaging mode, respectively noted as $\{H_i^0, i=0\ldots255\}$, $\{H_i^1, i=0\ldots255\}$ based on the luminance information.

The color image processing module is specifically configured to: make luminance adjustment to the first feature template of target object in the first imaging mode to obtain the second feature template according to following information:
statistics information of light intensity of pixels of the image of the target object in the first imaging mode and statistics information of light intensity of pixels of the image of the target object in the second imaging mode.

The color image processing module is specifically configured to:
determine corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same as or similar to the statistics information of light intensity of pixels of the image of the target object in the first imaging mode;
make luminance adjustment to the first feature template according to corresponding relationship between the light intensity of pixels of the image of the target object in the first imaging mode and light intensity of pixels of the image of the target object in the first imaging mode to which the luminance adjustment is made to obtain the second feature template.

The color image processing module is specifically configured to:
determine the corresponding relationship between the light intensity of pixels of the image of the target object in the first imaging mode and light intensity of pixels of the image of the target object in the first imaging mode to which the luminance adjustment is made according to following information:
mean value of light intensity of pixels of the image of the target object in the first imaging mode and mean value of light intensity of pixels of the image of the target object in the second imaging mode, and
variance of light intensity of pixels of the image of the target object in the first imaging mode and variance of light intensity of pixels of the image of the target object in the second imaging mode; and,
wherein mean value of light intensity of pixels of the image of the target object in the first imaging mode to which the luminance adjustment is made is the same as or similar to the mean value of light intensity of pixels of the image of the target object in the first imaging mode, and variance of light intensity of pixels of the image of the target object in the first imaging mode to which the luminance adjustment is made is the same as the variance of light intensity of pixels of the image of the target object in the first imaging mode. Optionally, the mean value may be weighted mean value, and variance may be weighted variance.

The color image processing module is specifically configured to:
determine, according to statistics information of light intensity of pixels of the image of the target object in the first imaging mode and statistics information of light intensity of pixels of the image of the target object in the second imaging mode, the light intensity T[i] of pixels of the image of the target object in the first imaging mode to which the luminance adjustment is made:

$$T[i] = (i - M_0) * \frac{V_1}{V_0} + M_1;$$

wherein $M_0$ is mean value of light intensity of pixels of the image of the target object in the first imaging mode, $M_1$ is mean value of light intensity of pixels of the image of the target object in the second imaging mode, $V_0$ is variance of light intensity of pixels of the image of the target object in the first imaging mode, $V_1$ is variance of light intensity of pixels of the image of the target object in the second imaging mode, i is light intensity of pixels of the image of the target object in the first imaging mode.

The color image processing module is specifically configured to: obtain, according to the corresponding relationship between the light intensity of pixels of the image of the target object in the first imaging mode and light intensity of pixels of the image of the target object in the first imaging mode to which the luminance adjustment is made, light intensity L'(x, y) of pixels of the second feature template:

$$L'(x,y)=T[L(x,y)];$$

wherein L(x, y) is light intensity of pixels of the first feature template, T[i] is light intensity of pixels of the image of the target object in the first imaging mode to which the luminance adjustment is made, i is light intensity of pixels of the image of the target object in the first imaging mode.

Optionally, the corresponding relationship may be presented by a mapping table, that is the mapping relationship of i and T[i]. The corresponding T[L(x, y)] can be found according to the light intensity L(x, y) of pixels of the first feature template and the mapping relationship, i.e. is the light intensity adjusted of pixels of the first feature template, which is light intensity L'(x, y) of pixels of the second feature template.

The light intensity of pixels comprises value of L channel of the image in Lab format, or value of Y channel of the image in YUV format.

The searching module 603 is further configured to: increase confidence level of a result of searching for the image of the target object by using the feature template irrelative with luminance in the second feature template, and/or, decrease confidence level of a result of searching for the image of the target object by using the feature template relative with luminance in the second feature template.

In the present embodiment, when the imaging modes switch not only the change of the resolution is considered, but it is also considered that the output image is a color image or a grey-scale image. So not only the automatic focus function does not suspend when the imaging mode switches, but accuracy of the automatic focus function is increased, the responsive time is decreased, adaptability to various scenarios for the automatic focus function is increased, adaptability to various picture taking mode for a picture taking device to make user interaction decreases and focus on the target object in time, accurately and efficiently to output satisfactory images or videos.

Figure 7:
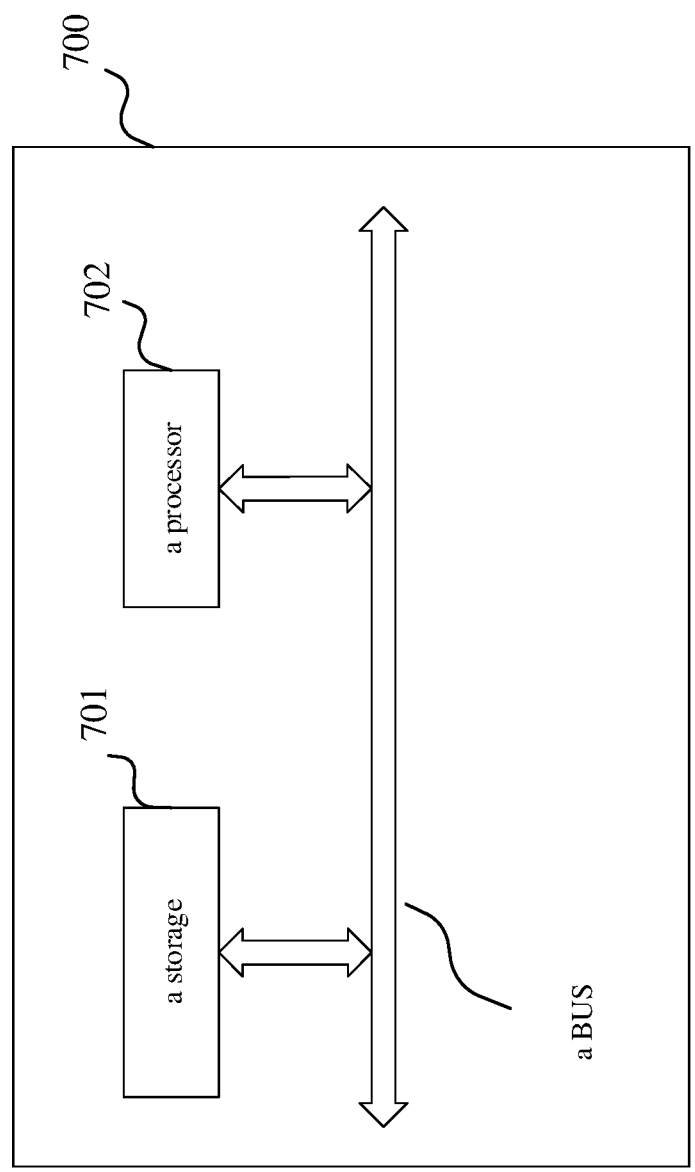
FIG. 7 is a structural diagram of another apparatus for focusing provided by the embodiment of the present invention.

In an embodiment, as shown in FIG. 7, an apparatus 700 for focusing is disclosed, wherein the apparatus comprises a storage 701, a processor 702 and computer instructions stored in the storage and executed by the processor, and the computer instructions are executed by the processor to perform steps of the method in any of the first to third embodiments or the fifth embodiment.

In the present embodiment, when the imaging mode switches not only the change of resolution is considered but it is considered that the output image is grey-scale map or color map. So it is ensured that the automatic focus function is not suspended when the imaging mode switches and when different picture taking devices switches, several of which having automatic focus function constitute a picture taking device group, the accuracy of the automatic focus function is increased and responsive time is decreased, adaptability to various scenarios is increased, adaptability to various imaging mode for the picture taking device is increased, and user interaction is decreased, so as to focus on the target object in time, accurately and efficiently and output constant satisfactory images or videos.

Figure 8:
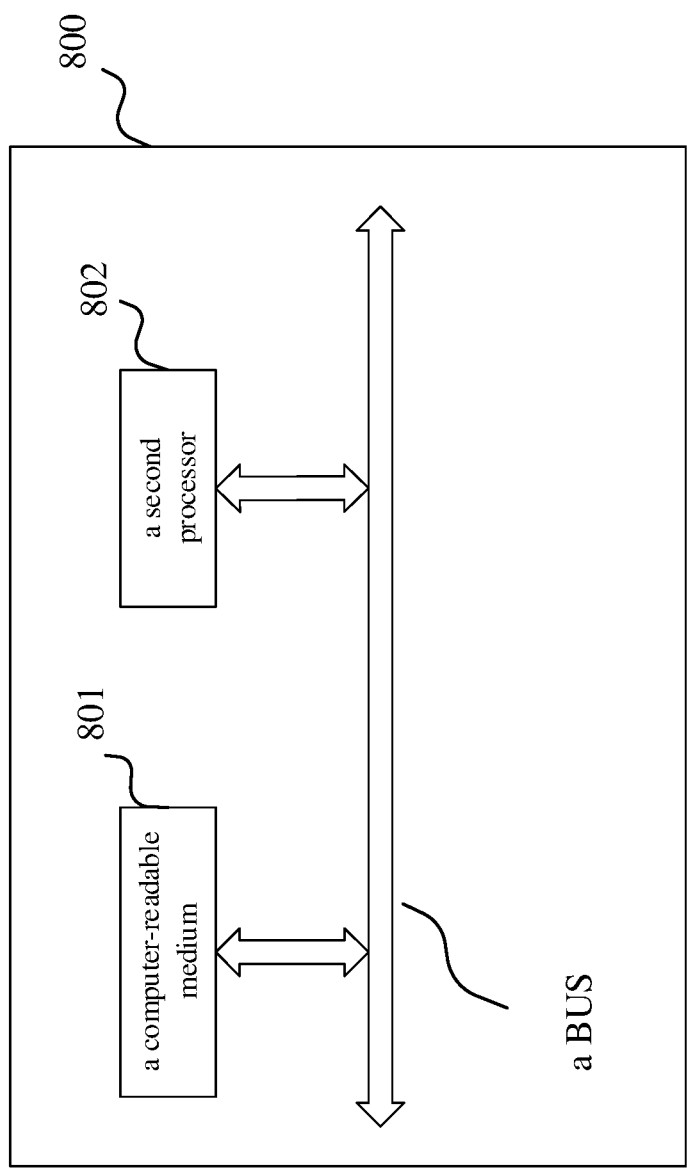
FIG. 8 is a structural diagram of another apparatus for focusing provided by the embodiment of the present invention.

In an embodiment, as shown in FIG. 8, a computer-readable medium 801 is provided, where the computer-readable medium 801 stores computer instructions, that, when executed by a second processor 802, cause the processor to perform steps of any of the first to the third embodiment or the fifth embodiment. Optionally, the computer-readable medium 801 may communicate with the second processor 802 by a BUS, which constitutes a system 800.

In the present embodiment, when the imaging mode switches not only the change of resolution is considered but it is considered that the output image is grey-scale map or color map. So it is ensured that the automatic focus function is not suspended when the imaging mode switches and when different picture taking devices switches several of which having automatic focus function constitute a picture taking device group, the accuracy of the automatic focus function is increased and responsive time is decreased, adaptability to various scenarios is increased, adaptability to various imaging mode for the picture taking device is increased, and user interaction is decreased, so as to focus on the target object in time, accurately and efficiently and output constant satisfactory images or videos.

Figure 9:
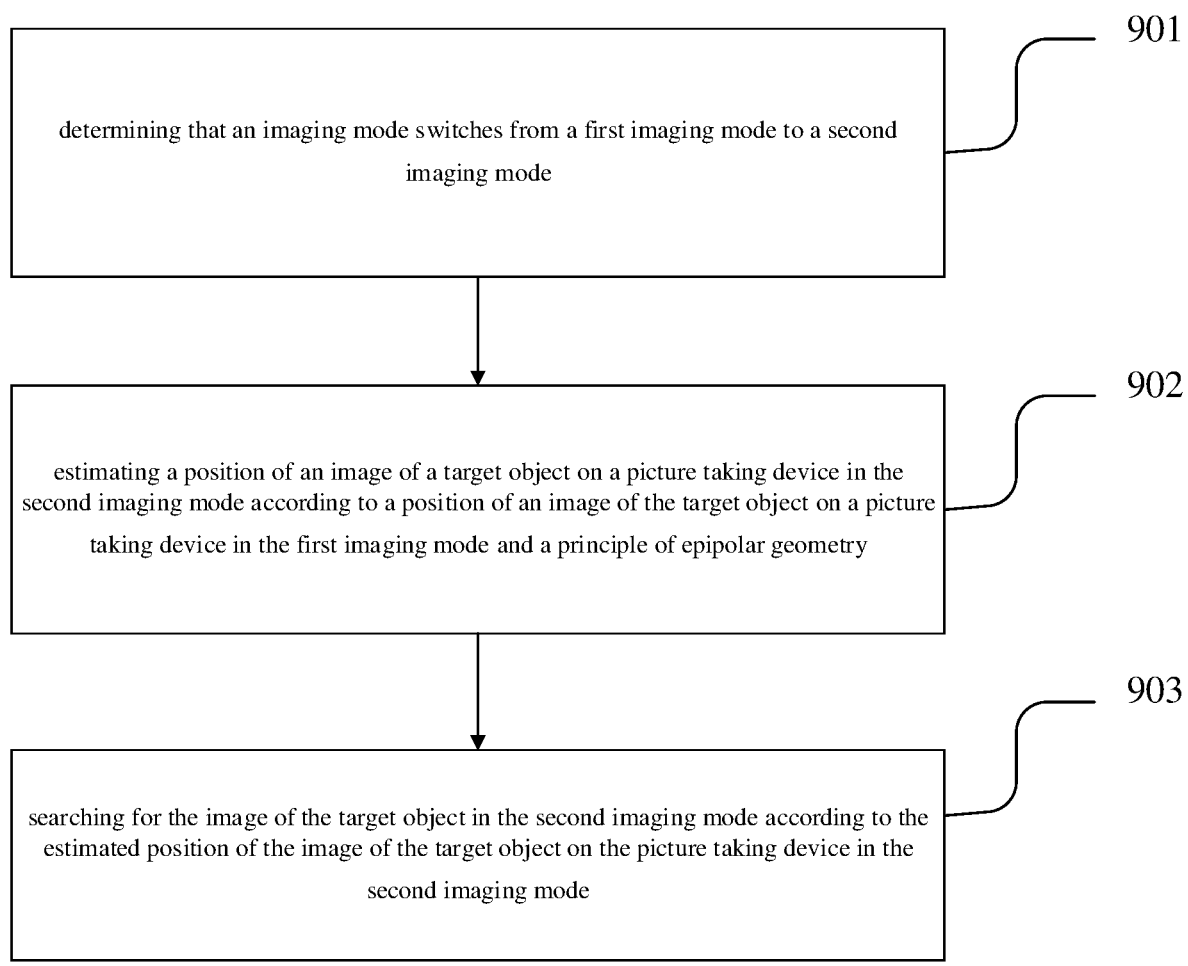
FIG. 9 is a flowchart of another method for focusing provided by the embodiment of the present invention.

As shown in FIG. 9, the followings illustrate the fifth embodiment in details. The fifth embodiment provides a method for focusing, where the method comprises:

Step 901, determining that an imaging mode switches from a first imaging mode to a second imaging mode;

Optionally, the first imaging mode may be one of an imaging mode of a color picture taking device, an imaging mode of a black-and-white picture taking device and an imaging mode of a depth picture taking device, and the second imaging mode may be one of an imaging mode of a color picture taking device, an imaging mode of a black-and-white picture taking device and an imaging mode of a depth picture taking device. Optionally, the embodiment of the present invention may be used in a dual camera scenario. For example, the imaging mode switches from a first imaging mode to a second imaging mode may be the imaging mode switches from a imaging mode of a color picture taking device to a imaging mode of a black-and-white picture taking device, or the imaging mode switches from a imaging mode of a color picture taking device to a imaging mode of another color picture taking device. Optionally, the imaging mode switches from a first imaging mode to a second imaging mode may be: different images of the target object may be obtained when a picture taking device is in different location, for example, the first imaging mode is one or more of a color picture taking device, a black-and-white picture taking device and a depth picture taking device obtain an image of the target object in a first location, and the second imaging mode is the same picture taking device obtains an image of the target object in a second location.

Step 902, estimating a position of an image of a target object on a picture taking device in the second imaging mode according to a position of an image of the target object on a picture taking device in the first imaging mode and a principle of epipolar geometry.

Step 903, searching for the image of the target object in the second imaging mode according to the estimated position of the image of the target object on the picture taking device in the second imaging mode.

Specifically, step 903 may be searching for the image of the target object in the whole image in the second imaging mode.

Optionally, at least two picture taking devices including the picture taking device in the first imaging mode and the picture taking device in the second imaging mode may constitute a picture taking device group, which needs camera calibration, undistortion, rectification, and so on. After that, if a position of an image of the target object on the picture taking device in the first imaging mode is known, according to the principle of epipolar geometry, the position of the image of the target object may be searched for in an epipolar line corresponding to the image of the target object on the picture taking device in the second imaging mode. Specifically, the estimating the position of the image of the target object on the picture taking device in the second imaging mode according to the position of the image of the target object on the picture taking device in the first imaging mode and the principle of epipolar geometry comprises: determining a position of an epipolar line corresponding to the image of the target object in the second imaging mode according to the position of the image of the target object on the picture taking device in the first imaging mode and an fundamental matrix between the picture taking device in the first imaging mode and the picture taking device in the second imaging mode; and the searching for the image of the target object in the second imaging mode according to the estimated position of the image of the target object on the picture taking device in the second imaging mode comprises: searching for the image of the target object on the epipolar line corresponding to the image of the target object in the second imaging mode.

Figure 10:
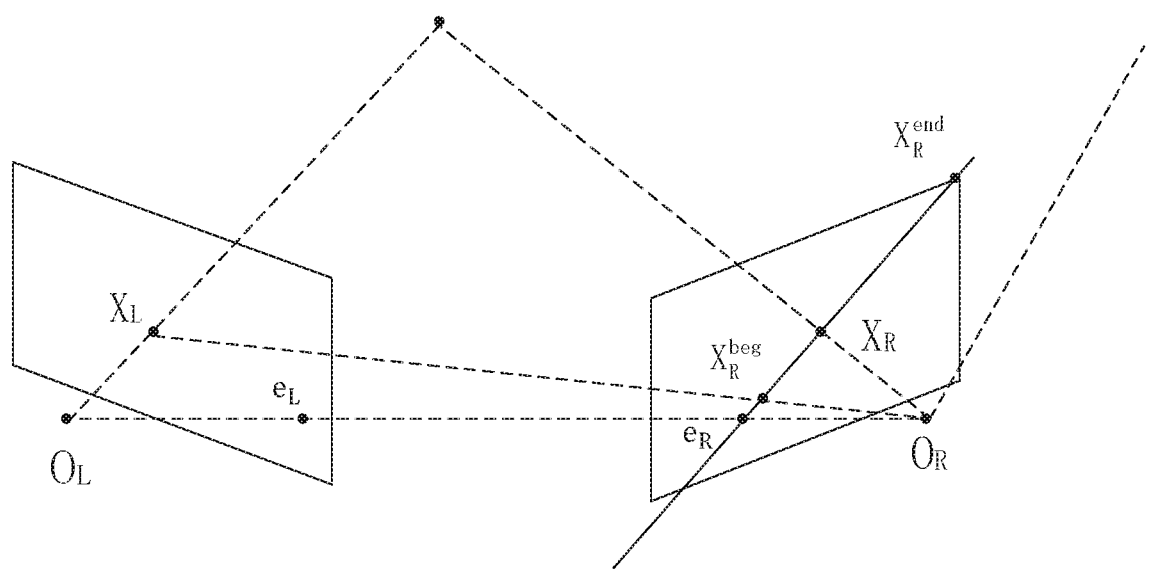
FIG. 10 is a imaging diagram of an apparatus with dual camera provided by the embodiment of the present invention.

As shown in FIG. 10, $O_L$ is an optic center of the left picture taking device of the picture taking device in the first imaging mode and the picture taking device in the second imaging mode, and $O_R$ is an optic center of the right picture taking device of the picture taking device in the first imaging mode and the picture taking device in the second imaging mode. It is noted that the left or right in the present invention is the left or right when facing the target object from the picture taking device. Point X is a position where the target object is located, $X_L$ is the position of the image of the target object on the left picture taking device, $X_R$ is the position of the image of the target object on the right picture taking device, $e_L$ is the intersection point where the line $O_L O_R$ intersects the image on the left picture taking device, and the straight lines $X_L e_L$ and $X_R e_R$ are Epipolar Lines. If currently the left picture taking device is used to shoot, the position $X_L$ of the image of the target object X on the left picture taking device is known, and when the right picture taking device is used to shoot which is switched from the left picture taking device, the image of the target object X on the right picture taking device may be searched for on the Epipolar Line $X_R e_R$. Or if currently the right picture taking device is used to shoot, the position $X_R$ of the image of the target object X on the right picture taking device is known, and when the left picture taking device is used to shoot which is switched from the right picture taking device, the image of the target object X on the left picture taking device may be searched for on the Epipolar Line $X_L e_L$.

Followings is described in a scenario that if currently the left picture taking device is used to shoot, the position $X_L$ of the image of the target object X on the left picture taking device is known, and the right picture taking device is used to shoot which is switched from the left picture taking device as an example. The imaging mode in which the left picture taking device is used to shoot is a first imaging mode, and the imaging mode in which the right picture taking device is used to shoot is a second imaging mode.

The first straight line is a straight line where an optic center of the picture taking device in the second imaging mode and the position of the image of the target object on the picture taking device in the first imaging mode are located. The second straight line is a straight line which is parallel with a straight line where an optic center of the picture taking device in the first imaging mode and the position of the image of the target object on the picture taking device in the first imaging mode are located, in which the optic center of the picture taking device in the second imaging mode is located. As shown in FIG. 10, the first straight line is the straight line $X_L O_R$, and the second straight line is the straight line $O_R P$.

The searching for the image of the target object on the epipolar line corresponding to the image of the target object in the second imaging mode comprises:

determining an intersection point as a first searching point where the first straight line intersects the epipolar line corresponding to the image of the target object in the second imaging mode, determining an intersection point as a second searching point where the second straight line intersects the epipolar line, wherein the second searching point is on the whole image in the second imaging mode, and searching for the image of the target object on the epipolar line between the first searching point and the second searching point. As shown in FIG. 10, the first straight line is the straight line $X_L O_R$, the epipolar line corresponding to the image of the target object in the second imaging mode is $X_R e_R$, the first searching point is $X_R^{beg}$, the second straight line is the straight line $O_R P$, the second searching point is not shown in FIG. 10. The searching for the image of the target object between the first searching point and the second searching point comprises: searching from the first searching point to the second searching point, or searching from the second searching point to the first searching point, or searching discontinuously which is searching a distance after a certain distance, or searching from the first searching point and the second searching point to the middle respectively. The present invention does not limit the searching direction and the searching way, and neither is following embodiments.

Or, the searching for the image of the target object on the epipolar line corresponding to the image of the target object in the second imaging mode further comprises:

when the intersection point where the second straight line intersects the epipolar line corresponding to the image of the target object in the second imaging mode exists and is not on the whole image in the second imaging mode, determining an intersection point as a third searching point where the first straight line intersects the epipolar line, determining an intersection point as a fourth searching point where the epipolar line intersects boundary of the whole image in the second imaging mode, wherein the fourth searching point is located between the intersection point where the second straight line intersects the epipolar line and the third searching point, and searching for the image of the target object on the epipolar line between the third searching point and the fourth searching point. As shown in FIG. 10, the intersection point where the straight line $O_R P$ intersects the epipolar line $X_R e_R$ exists and is not on the whole image in the second imaging mode, the third searching point is $X_R^{beg}$, and the fourth searching point is $X_R^{end}$, then the image of the target object may be searched for between $X_R^{beg}$ and $X_R^{end}$ on the epipolar line $X_R e_R$.

Or, the searching for the image of the target object on the epipolar line corresponding to the image of the target object in the second imaging mode further comprises:

when the intersection point where the second straight line intersects the epipolar line does not exist, determining an intersection point as a fifth searching point where the first straight line intersects the epipolar line, determining two intersection points as a sixth searching point and a seventh searching point where the epipolar line intersects boundary of the whole image in the second imaging mode, and searching for the image of the target object on the epipolar line between the fifth searching point and the sixth searching point or searching for the image of the target object on the epipolar line between the fifth searching point and the seventh searching point. As shown in FIG. 10, when the straight line $O_R P$ is parallel with the epipolar line $X_R e_R$, the intersection point where the second straight line intersects the epipolar line corresponding to the image of the target object in the second imaging mode does not exist. The fifth searching point is $X_R^{beg}$, the sixth searching point is $X_R^{end}$, the seventh searching point is not shown in the FIG. 10, and the image of the target object may be searched for between $X_R^{beg}$ and $X_R^{end}$ or between $X_R^{beg}$ and the seventh searching point. Or at first it is determined whether between $X_R^{beg}$ and $X_R^{end}$ or between $X_R^{beg}$ and the seventh searching point the image of the target object is located, and the searching is performed in the determined searching section.

Furthermore, the position of the epipolar line corresponding to the image of the target object is determined according to the following formula:

$$[u_L \quad v_L \quad 1] \cdot F \cdot \begin{bmatrix} u_R \\ v_R \\ 1 \end{bmatrix} = 0;$$

wherein the ($u_L$, $v_L$) is a coordinate of the image of the target object on the left picture taking device of the picture taking device in the first imaging mode and the picture taking device in the second imaging mode, the ($u_R$, $v_R$) is a coordinate of the image of the target object on the right picture taking device of the picture taking device in the first imaging mode and the picture taking device in the second imaging mode, and $F \in \mathbb{R}_{3 \times 3}$ is the fundamental matrix between the picture taking device in the first imaging mode and the picture taking device in the second imaging mode. The fundamental matrix may be obtained by camera calibration. The left and right mentioned above are the left and right when facing the target object from the picture taking device, and the following is the same.

When the imaging plane of the picture taking device in the first imaging mode and the imaging plane of the picture taking device in the second imaging mode are the same, such as dual cameras, estimating the position of the image of the target object on the picture taking device in the second imaging mode according to the position of the image of the target object on the picture taking device in the first imaging mode, depth information between the target object and the picture taking device in the first imaging mode or the picture taking device in the second imaging mode, focal length of the picture taking device in the first imaging mode or the picture taking device in the second imaging mode and distance between the picture taking device in the first imaging mode and the picture taking device in the second imaging mode.

Figure 11:
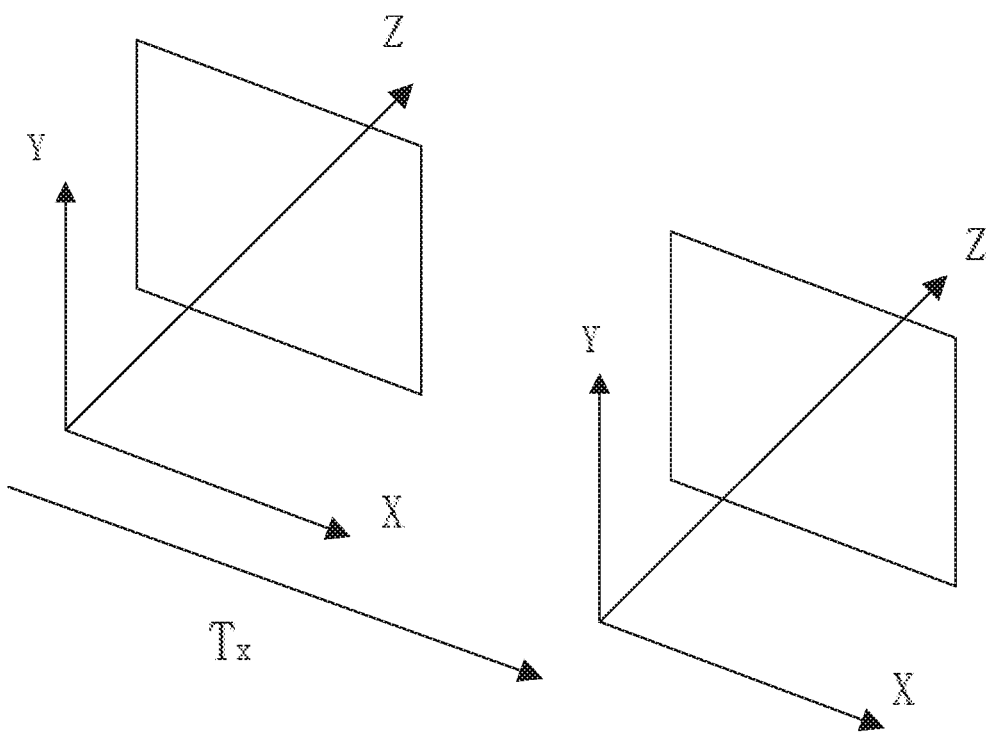
FIG. 11 is a imaging diagram of another apparatus with dual camera provided by the embodiment of the present invention.

Taking two picture taking devices as an example, before using the picture taking device in the first imaging mode and the picture taking device in the second imaging mode, undistortion and dual cameras parallel Epipolar Rectification may be performed to the above picture taking devices. Then positions of origins of coordinate systems of the two picture taking devices are the same compared to the two picture taking devices, respectively. The coordinates of the centers of the images of the two picture taking devices are the same in their coordinate systems, respectively, noted as ($c_x$, $c_y$), and the focal lengths are the same, noted as f. As shown in FIG. 11, Z-axis of the coordinate systems of the two picture taking devices is through the centers of their images, respectively, and the distance between origins of two coordinate systems is $T_x$.

When the imaging plane of the picture taking device in the first imaging mode and the imaging plane of the picture taking device in the second imaging mode are the same, and the picture taking device in the first imaging mode and the picture taking device in the second imaging mode are located horizontally, turning a coordinate of a pixel ($u_L$, $v_L$) on the left picture taking device of the picture taking device in the first imaging mode and the picture taking device in the second imaging mode to ($u'_L$, $v'_L$), and turning a coordinate of a pixel ($u_R$, $v_R$) on the right picture taking device of the picture taking device in the first imaging mode and the picture taking device in the second imaging mode to ($u'_R$, $v'_R$):

$$[u'_L, v'_L, 1] = K \cdot K_L^{-1} \cdot [u_L, v_L, 1]^T,$$

$$[u'_R, v'_R, 1] = K \cdot K_R^{-1} \cdot [u_R, v_R, 1]^T;$$

wherein before the turning a camera matrix of the left picture taking device of the picture taking device in the first imaging mode and the picture taking device in the second imaging mode is $$K_L = \begin{bmatrix} f_x^L & 0 & c_x^L \\ 0 & f_y^L & c_y^L \\ 0 & 0 & 1 \end{bmatrix},$$

a camera matrix of the right picture taking device of the picture taking device in the first imaging mode and the picture taking device in the second imaging mode is $$K_R = \begin{bmatrix} f_x^R & 0 & c_x^R \\ 0 & f_y^R & c_y^R \\ 0 & 0 & 1 \end{bmatrix},$$

and ($f_x^L$, $f_y^L$) is a coordinate of a focal point of the left picture taking device of the picture taking device in the first imaging mode and the picture taking device in the second imaging mode, ($f_x^R$, $f_y^R$) is a coordinate of a focal point of the right picture taking device of the picture taking device in the first imaging mode and the picture taking device in the second imaging mode, ($c_x^L$, $c_y^L$) is a coordinate of a central point of the image of left picture taking device of the picture taking device in the first imaging mode and the picture taking device in the second imaging mode, ($c_x^R$, $c_y^R$) is a coordinate of a central point of the image of right picture taking device of the picture taking device in the first imaging mode and the picture taking device in the second imaging mode; and wherein after the turning a camera matrix of the picture taking device in the first imaging mode and a camera matrix of the picture taking device in the second imaging mode are $$K = \begin{bmatrix} f & 0 & c_x \\ 0 & f & c_y \\ 0 & 0 & 1 \end{bmatrix},$$

where f is focal length after the turning, and ($c_x$, $c_y$) is a coordinate of a center of the whole image after the turning. The left and right mentioned above is the left and right when facing the target object from the picture taking device.

$$\frac{f}{Z} = \frac{x_L - x_R}{T_x};$$

Figure 12:
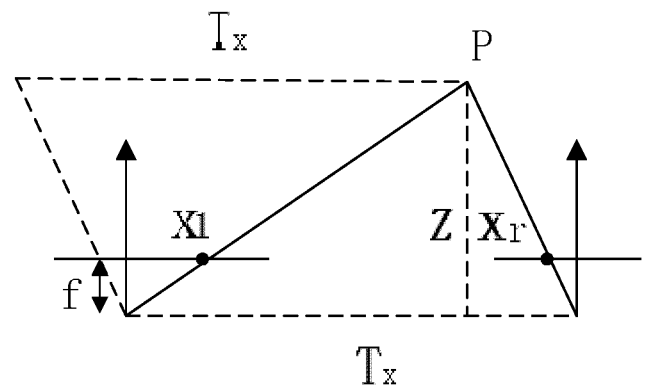
FIG. 12 is a imaging diagram of another apparatus with dual camera provided by the embodiment of the present invention.

As shown in FIG. 12, point P is the target object, and when the imaging plane of the picture taking device in the first imaging mode and the imaging plane of the picture taking device in the second imaging mode are the same, and the picture taking device in the first imaging mode and the picture taking device in the second imaging mode are located horizontally, wherein the being located horizontally means being physically placed horizontally or achieving an effect of being located horizontally by an algorithm, estimating the position of the image of the target object on the picture taking device in the second imaging mode according to the following formula:

$$\frac{f}{Z} = \frac{x_L - x_R}{T_x};$$

wherein f is the focal length of the picture taking device in the first imaging mode or the picture taking device in the second imaging mode, Z is the depth information between the target object and the picture taking device in the first imaging mode or the picture taking device in the second imaging mode, $T_x$ is horizontal distance between the picture taking device in the first imaging mode and the picture taking device in the second imaging mode, $x_L$ is a coordinate in the horizontal direction of the image of the target object on the left picture taking device ($x_l$ in the figure), $x_R$ is a coordinate in the horizontal direction of the image of the target object on the right picture taking device ($x_r$ in the figure), and the image of the target object on the picture taking device in the first imaging mode and the image of the target object on the picture taking device in the second imaging mode are the image of the target object on the left picture taking device and the image of the target object on the right picture taking device respectively. The left and right is the left and right when facing the target object from the picture taking device, and the following is the same. After transforming the camera matrix, the focal length of the picture taking device in the first imaging mode or the focal length of the picture taking device in the second imaging mode are the same. Or, When the imaging plane of the picture taking device in the first imaging mode and the imaging plane of the picture taking device in the second imaging mode are the same, and the picture taking device in the first imaging mode and the picture taking device in the second imaging mode are located vertically, estimating the position of the image of the target object on the picture taking device in the second imaging mode according to the following formula:

$$\frac{f}{Z} = \frac{y_T - y_B}{T_y};$$

wherein f is the focal length of the picture taking device in the first imaging mode or the picture taking device in the second imaging mode, Z is the depth information between the target object and the picture taking device in the first imaging mode or the picture taking device in the second imaging mode, $T_y$ is vertical distance between the picture taking device in the first imaging mode and the picture taking device in the second imaging mode, $y_T$ is a coordinate in the vertical direction of the image of the target object on the upper picture taking device, $y_B$ is a coordinate in the vertical direction of the image of the target object on the nether picture taking device, and the image of the target object on the picture taking device in the first imaging mode and the image of the target object on the picture taking device in the second imaging mode are the image of the target object on the upper picture taking device and the image of the target object on the nether picture taking device respectively.

Furthermore, the method further comprises:

obtaining luminance information of a first feature template of the target object in the first imaging mode; making luminance adjustment to the luminance information of the first feature template to obtain a second feature template; wherein the second feature template is used to search for the image of the target object in the second imaging mode.

The second feature template is used to search for the image of the target object in the second imaging mode comprises:

increasing confidence level of a result of searching for the image of the target object by using the feature template irrelative with luminance in the second feature template, or, decreasing confidence level of a result of searching for the image of the target object by using the feature template relative with luminance in the second feature template.

The method further comprises: obtaining a grey-scale map of the image of the target object in the second imaging mode, and making luminance adjustment to the first feature template according to the grey-scale map, searching for the image of the target object by the first feature template after the luminance adjustment, wherein the first feature template after the luminance adjustment is added into by a color feature of the image of the target object obtained in the second imaging mode, wherein the first feature template after the luminance adjustment and added into by the color feature is used to search for the image of the target object.

About the method related to the luminance adjustment and feature template, the related description in the second embodiment may be referred to.

According to the method described above, the automatic focus function of a picture taking device group is not suspended, which is comprised of several picture taking devices having automatic focus function when different picture taking devices switches. The target object may be focused on constantly, even if the target object is moving compared to the picture taking device. The adaptability to various imaging mode for the picture taking device is increased, and user interaction is decreased, so as to focus on the target object in time, accurately and efficiently and output constant satisfactory images or videos.

Figure 13:
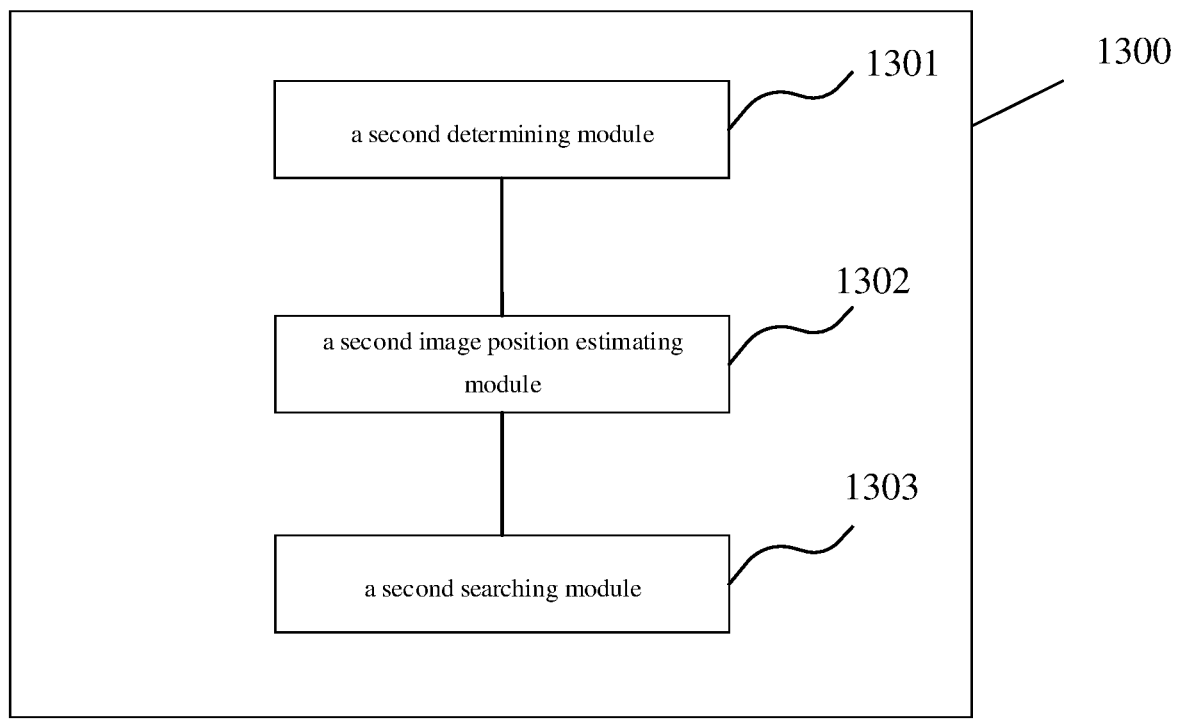
FIG. 13 is a structural diagram of another apparatus for focusing provided by the embodiment of the present invention.

As shown in FIG. 13, the followings illustrate the sixth embodiment in details. The embodiment of the present invention provides an apparatus 1300 for focusing, wherein the apparatus comprises:

a second determining module 1301, configured to determine that an imaging mode switches from a first imaging mode to a second imaging mode;

Optionally, the first imaging mode may be one of an imaging mode of a color picture taking device, an imaging mode of a black-and-white picture taking device and an imaging mode of a depth picture taking device, and the second imaging mode may be one of an imaging mode of a color picture taking device, an imaging mode of a black-and-white picture taking device and an imaging mode of a depth picture taking device. Optionally, the embodiment of the present invention may be used in a dual camera scenario. For example, That the imaging mode switches from a first imaging mode to a second imaging mode may be the imaging mode switches from a imaging mode of a color picture taking device to a imaging mode of a black-and-white picture taking device, or the imaging mode switches from a imaging mode of a color picture taking device to a imaging mode of another color picture taking device. Optionally, That the imaging mode switches from a first imaging mode to a second imaging mode may be: different images of the target object may be obtained when a picture taking device is in different location, for example, the first imaging mode is one or more of a color picture taking device, a black-and-white picture taking device and a depth picture taking device obtain an image of the target object in a first location, and the second imaging mode is the same picture taking device obtains an image of the target object in a second location.

a second image position estimating module 1302, configured to estimate a position of an image of a target object on a picture taking device in the second imaging mode according to a position of an image of the target object on a picture taking device in the first imaging mode and a principle of epipolar geometry;

a second searching module 1303, configured to search for the image of the target object in the second imaging mode according to the estimated position of the image of the target object on the picture taking device in the second imaging mode.

Specifically, the second searching module 1303 is configured to search for the image of the target object in the whole image in the second imaging mode.

Optionally, at least two picture taking devices including the picture taking device in the first imaging mode and the picture taking device in the second imaging mode may constitute a picture taking device group, which needs camera calibration, undistortion, rectification, and so on. After that, if a position of an image of the target object on the picture taking device in the first imaging mode is known, according to the principle of epipolar geometry, the position of the image of the target object may be searched for in an epipolar line corresponding to the image of the target object on the picture taking device in the second imaging mode. Specifically, the second image position estimating module 1302 is specifically configured to determine a position of an epipolar line corresponding to the image of the target object in the second imaging mode according to the position of the image of the target object on the picture taking device in the first imaging mode and an fundamental matrix between the picture taking device in the first imaging mode and the picture taking device in the second imaging mode; and the second searching module 1303 is specifically configured to search for the image of the target object on the epipolar line corresponding to the image of the target object in the second imaging mode.

As shown in FIG. 10, $O_L$ is an optic center of the left picture taking device of the picture taking device in the first imaging mode and the picture taking device in the second imaging mode, and $O_R$ is an optic center of the right picture taking device of the picture taking device in the first imaging mode and the picture taking device in the second imaging mode. It is noted that the left or right in the present invention is the left or right when facing the target object from the picture taking device. Point X is a position where the target object is located, $X_L$ is the position of the image of the target object on the left picture taking device, $X_R$ is the position of the image of the target object on the right picture taking device, $e_L$ is the intersection point where the line $O_L O_R$ intersects the image on the right picture taking device, and the straight lines $X_L e_L$ and $X_R e_R$ are Epipolar Lines. If currently the left picture taking device is used to shoot, the position $X_L$ of the image of the target object X on the left picture taking device is known, and when the right picture taking device is used to shoot which is switched from the left picture taking device, the image of the target object X on the right picture taking device may be searched for on the Epipolar Line $X_R e_R$. Or if currently the right picture taking device is used to shoot, the position $X_R$ of the image of the target object X on the right picture taking device is known, and when the left picture taking device is used to shoot which is switched from the right picture taking device, the image of the target object X on the left picture taking device may be searched for on the Epipolar Line $X_L e_L$.

Followings is described in a scenario that If currently the left picture taking device is used to shoot, the position $X_L$ of the image of the target object X on the left picture taking device is known, and the right picture taking device is used to shoot which is switched from the left picture taking device as an example. The imaging mode in which the left picture taking device is used to shoot is a first imaging mode, and the imaging mode in which the right picture taking device is used to shoot is a second imaging mode.

The first straight line is a straight line where an optic center of the picture taking device in the second imaging mode and the position of the image of the target object on the picture taking device in the first imaging mode are located. The second straight line is a straight line which is parallel with a straight line where an optic center of the picture taking device in the first imaging mode and the position of the image of the target object on the picture taking device in the first imaging mode are located, in which the optic center of the picture taking device in the second imaging mode is located. As shown in FIG. 10, the first straight line is the straight line $X_L O_R$, and the second straight line is the straight line $O_R P$.

The second searching module is specifically configured to determine an intersection point as a first searching point where a first straight line intersects the epipolar line corresponding to the image of the target object in the second imaging mode, determine an intersection point as a second searching point where a second straight line intersects the epipolar line, wherein the second searching point is on the whole image in the second imaging mode, and search for the image of the target object on the epipolar line between the first searching point and the second searching point. As shown in FIG. 10, the first straight line is the straight line $X_L O_R$, the epipolar line corresponding to the image of the target object in the second imaging mode is $X_R e_R$, the first searching point is $X_R^{beg}$, the second straight line is the straight line $O_R P$, the second searching point is not shown in FIG. 10. The searching for the image of the target object between the first searching point and the second searching point comprises: searching from the first searching point to the second searching point, or searching from the second searching point to the first searching point, or searching discontinuously which is searching a distance from a distance, or searching from the first searching point and the second searching point to the middle respectively. The present invention does not limit the searching direction and the searching way, and neither is following embodiments. Or, When the intersection point where the second straight line intersects the epipolar line exists and is not on the whole image in the second imaging mode, determine an intersection point as a third searching point where the first straight line intersects the epipolar line, determine an intersection point as a fourth searching point where the epipolar line intersects boundary of the whole image in the second imaging mode, wherein the fourth searching point is located between the intersection point where the second straight line intersects the epipolar line and the third searching point, and search for the image of the target object on the epipolar line between the third searching point and the fourth searching point. As shown in FIG. 10, the intersection point where the straight line $O_R P$ intersects the epipolar line $X_R e_R$ exists and is not on the whole image in the second imaging mode, the third searching point is $X_R^{beg}$, and the fourth searching point is $X_R^{end}$, then the image of the target object may be searched for between $X_R^{beg}$ and $X_R^{end}$ on the epipolar line $X_R e_R$. Or, When the intersection point where the second straight line intersects the epipolar line does not exist, determine an intersection point as a fifth searching point where the first straight line intersects the epipolar line, determine two intersection points as a sixth searching point and a seventh searching point where the epipolar line intersects boundary of the whole image in the second imaging mode, and search for the image of the target object on the epipolar line between the fifth searching point and the sixth searching point or search for the image of the target object on the epipolar line between the fifth searching point and the seventh searching point. As shown in FIG. 10, when the straight line $O_R P$ is parallel with the epipolar line $X_R e_R$, the intersection point where the second straight line intersects the epipolar line corresponding to the image of the target object in the second imaging mode does not exist. The fifth searching point is $X_R^{beg}$, the sixth searching point is $X_R^{end}$, the seventh searching point is not shown in the FIG. 10, and the image of the target object may be searched for between $X_R^{beg}$ and $X_R^{end}$ or between $X_R^{beg}$ and the seventh searching point. Or at first it is determined whether between $X_R^{beg}$ and $X_R^{end}$ or between $X_R^{beg}$ and the seventh searching point the image of the target object is located, and the searching is performed in the determined searching section.

the second image position estimating module 1302 is specifically configured to determine the position of the epipolar line corresponding to the image of the target object in the second imaging mode according to the following formula:

$$[u_L \ v_L \ 1] \cdot F \cdot \begin{bmatrix} u_R \\ v_R \\ 1 \end{bmatrix} = 0;$$

wherein the $(u_L, v_L)$ is a coordinate of the image of the target object on the left picture taking device of the picture taking device in the first imaging mode and the picture taking device in the second imaging mode, the $(u_R, v_R)$ is a coordinate of the image of the target object on the right picture taking device of the picture taking device in the first imaging mode and the picture taking device in the second imaging mode, and $F \in \mathbb{R}_{3\times 3}$ is the fundamental matrix between the picture taking device in the first imaging mode and the picture taking device in the second imaging mode. The fundamental matrix may be obtained by camera calibration. The left and right mentioned above are the left and right when facing the target object from the picture taking device, and the following is the same.

the second image position estimating module 1302 is specifically configured to estimate the position of the image of the target object on the picture taking device in the second imaging mode according to the position of the image of the target object on the picture taking device in the first imaging mode, depth information between the target object and the picture taking device in the first imaging mode or the picture taking device in the second imaging mode, focal length of the picture taking device in the first imaging mode or the picture taking device in the second imaging mode and distance between the picture taking device in the first imaging mode and the picture taking device in the second imaging mode when the imaging plane of the picture taking device in the first imaging mode and the imaging plane of the picture taking device in the second imaging mode are the same. For example, the picture taking device in the first imaging mode and the picture taking device in the second imaging mode may constitute dual cameras.

Taking two picture taking devices as an example, before using the picture taking device in the first imaging mode and the picture taking device in the second imaging mode, undistortion and dual cameras parallel Epipolar Rectification may be performed to the above picture taking devices. Then positions of origins of coordinate systems of the two picture taking devices are the same compared to the two picture taking devices, respectively. The coordinates of the centers of the images of the two picture taking devices are the same in their coordinate systems, respectively, noted as $(c_x, c_y)$, and the focal lengths are the same, noted as f. As shown in FIG. 11, Z-axis of the coordinate systems of the two picture taking devices is through the centers of their images, respectively, and the distance between origins of two coordinate systems is $T_x$.

the apparatus further comprises a turning module, and the turning module is configured to:

when the imaging plane of the picture taking device in the first imaging mode and the imaging plane of the picture taking device in the second imaging mode are the same, and the picture taking device in the first imaging mode and the picture taking device in the second imaging mode are located horizontally, turn a coordinate of a pixel $(u_L, v_L)$ on the left picture taking device of the picture taking device in the first imaging mode and the picture taking device in the second imaging mode to $(u'_L, v'_L)$, and turn a coordinate of a pixel $(u_R, v_R)$ on the right picture taking device of the picture taking device in the first imaging mode and the picture taking device in the second imaging mode to $(u'_R, v'_R)$:

$$[u'_L, v'_L, 1] = K \cdot K_L^{-1} \cdot [u_L, v_L, 1]^T,$$

$$[u'_R, v'_R, 1] = K \cdot K_R^{-1} \cdot [u_R, v_R, 1]^T;$$

wherein before the turning a camera matrix of the left picture taking device of the picture taking device in the first imaging mode and the picture taking device in the second imaging mode is $$K_L = \begin{bmatrix} f_x^L & 0 & c_x^L \\ 0 & f_y^L & c_y^L \\ 0 & 0 & 1 \end{bmatrix},$$

a camera matrix of the right picture taking device of the picture taking device in the first imaging mode and the picture taking device in the second imaging mode is $$K_R = \begin{bmatrix} f_x^R & 0 & c_x^R \\ 0 & f_y^R & c_y^R \\ 0 & 0 & 1 \end{bmatrix},$$

and $(f_x^L, f_y^L)$ is a coordinate of a focal point of the left picture taking device of the picture taking device in the first imaging mode and the picture taking device in the second imaging mode, $(f_x^R, f_y^R)$ is a coordinate of a focal point of the right picture taking device of the picture taking device in the first imaging mode and the picture taking device in the second imaging mode, $(c_x^L, c_y^L)$ is a coordinate of a central point of the image of left picture taking device of the picture taking device in the first imaging mode and the picture taking device in the second imaging mode, $(c_x^R, c_y^R)$ is a coordinate of a central point of the image of right picture taking device of the picture taking device in the first imaging mode and the picture taking device in the second imaging mode; and wherein after the turning a camera matrix of the picture taking device in the first imaging mode and a camera matrix of the picture taking device in the second imaging mode are $$K = \begin{bmatrix} f & 0 & c_x \\ 0 & f & c_y \\ 0 & 0 & 1 \end{bmatrix},$$

where f is focal length after the turning, and $(c_x, c_y)$ is a coordinate of a center of the whole image after the turning. The left and right mentioned above is the left and right when facing the target object from the picture taking device.

As shown in FIG. 12, point P is the target object. The second image position estimating module 1302 is specifically configured to: when the imaging plane of the picture taking device in the first imaging mode and the imaging plane of the picture taking device in the second imaging mode are the same, and the picture taking device in the first imaging mode and the picture taking device in the second imaging mode are located horizontally, estimate the position of the image of the target object on the picture taking device in the second imaging mode according to the following formula:

$$\frac{f}{Z} = \frac{x_L - x_R}{T_x};$$

wherein f is the focal length of the picture taking device in the first imaging mode or the picture taking device in the second imaging mode, Z is the depth information between the target object and the picture taking device in the first imaging mode or the picture taking device in the second imaging mode, $T_x$ is horizontal distance between the picture taking device in the first imaging mode and the picture taking device in the second imaging mode, $x_L$ is a coordinate in the horizontal direction of the image of the target object on the left picture taking device ($x_1$ in the figure), $x_R$ is a coordinate in the horizontal direction of the image of the target object on the right picture taking device ($x_r$ in the figure), and the image of the target object on the picture taking device in the first imaging mode and the image of the target object on the picture taking device in the second imaging mode are the image of the target object on the left picture taking device and the image of the target object on the right picture taking device respectively. The left and right is the left and right when facing the target object from the picture taking device, and the following is the same. After transforming the camera matrix, the focal length of the picture taking device in the first imaging mode or the focal length of the picture taking device in the second imaging mode are the same. Or, When the imaging plane of the picture taking device in the first imaging mode and the imaging plane of the picture taking device in the second imaging mode are the same, and the picture taking device in the first imaging mode and the picture taking device in the second imaging mode are located vertically, estimate the position of the image of the target object on the picture taking device in the second imaging mode according to the following formula:

$$\frac{f}{Z} = \frac{y_T - y_B}{T_y};$$

wherein f is the focal length of the picture taking device in the first imaging mode or the picture taking device in the second imaging mode, Z is the depth information between the target object and the picture taking device in the first imaging mode or the picture taking device in the second imaging mode, $T_y$ is vertical distance between the picture taking device in the first imaging mode and the picture taking device in the second imaging mode, $y_T$ is a coordinate in the vertical direction of the image of the target object on the upper picture taking device, $y_B$ is a coordinate in the vertical direction of the image of the target object on the nether picture taking device, and the image of the target object on the picture taking device in the first imaging mode and the image of the target object on the picture taking device in the second imaging mode are the image of the target object on the upper picture taking device and the image of the target object on the nether picture taking device respectively.

The apparatus further comprises a second obtaining module and a second luminance adjusting module, wherein the second obtaining module is configured to obtain luminance information of a first feature template of the target object in the first imaging mode; the second luminance adjusting module is configured to make luminance adjustment to the luminance information of the first feature template to obtain a second feature template; and the second searching module 1303 is further configured to search for the image of the target object in the second imaging mode by the second feature template.

The second searching module 1303 is further configured to increase confidence level of a result of searching for the image of the target object by using the feature template irrelative with luminance in the second feature template, or, decrease confidence level of a result of searching for the image of the target object by using the feature template relative with luminance in the second feature template.

Wherein the apparatus further comprises a second color image processing module and a second color feature adding module, wherein the second color image processing module is configured to obtain a grey-scale map of the image of the target object in the second imaging mode, and make luminance adjustment to the first feature template according to the grey-scale map; the second color feature adding module is configured to search for the image of the target object by the first feature template after the luminance adjustment, wherein the first feature template after the luminance adjustment is added into by a color feature of the image of the target object obtained in the second imaging mode; and the second searching module is further configured to search for the image of the target object by the first feature template after the luminance adjustment and added into by the color feature.

About the method related to the luminance adjustment and feature template, the related description in the fourth embodiment may be referred to.

According to the apparatus described above, the automatic focus function of a picture taking device group is not suspended, which is comprised of several picture taking devices having automatic focus function when different picture taking devices switches. The target object may be focused on constantly, even if the target object is moving compared to the picture taking device. The adaptability to various imaging mode for the picture taking device is increased, and user interaction is decreased, so as to focus on the target object in time, accurately and efficiently and output constant satisfactory images or videos.

For example, the computer instructions may be separated to form one or more modules/units, the one or more modules/units are stored in the storage, and executed by the processor to complete the present invention. The one or more modules/units may be computer instructions segments that can achieve a particular function, and the computer instructions segments are used to describe a process that the computer instructions are executed in the device/terminal.

The device/terminal may be computing device including cellphone, pad, desk computer, laptop, personal digital assistant, cloud server, etc. The device/terminal may further include, but not limited to, a processor or storage. A person skilled in the art can understand the diagram of the present invention is only an example of the device/terminal, and not a limitation of the device/terminal. The device/terminal can include more or less parts than what is shown in the diagram, or combination of some parts, or different parts. For example, the device/terminal can include input equipment, output equipment, network access equipment, or bus etc.

The processor may be a central processing unit (CPU), another general processor, a digital signal processor (DSP), an application specific integrated circuit (ASIC), a field-programmable gate array (FPGA) or another programmable logical component, a discrete components gate, a transistor logical component, or a discrete hardware component. The general processor may be a micro-processor or another regular processor. The processor is the control center of the device/terminal, connecting each part of the device/terminal by using different interfaces and circuits.

The storage may be used to store the computer instructions and/or a module, the processor realize various function of the device/terminal by executing the computer instructions and/or module stored in the storage and invoking data stored in the storage. The storage may include an instruction sector and a data sector, where the instruction sector may store operating system, an application program for achieving at least one function (for example a picture viewing function) etc. Besides, the storage may include a high speed random access memory, or a nonvolatile memory, such as hard drive, memory, plug in hard drive, smart media card (SMC), secure digital (SD) card, flash card, at least one disk, flash element, or other volatile solid state storage.

The modules/units integrated in the device/terminal may be stored in a computer-readable medium when modules/units are realized in a form of a software function unit, and sold or used as an independent product. Based on this understanding, when realizing the present invention, a part or all of the procedure in the method of the above embodiment may be completed by computer instructions instructing a relative hardware, where the computer instructions are stored in a computer-readable medium, when executed by a processor, cause the processor to perform steps of any of the above method embodiments. The computer instructions include computer program codes, and the computer program codes may be a form of a source code, an object code, an .exe file, or some middle status. The computer-readable medium may include: an entity or device carrying the computer program codes, a recording medium, a USB stick, a mobile hard disk, a magnetic disc, a compact disc, computer storage, read-only memory (ROM), random access memory (RAM), electrical carrier signal, telecommunication signal, or a software distributing medium.

The image of the target object in any of the above embodiments may be an image of a part of the target object, or that of the whole target object. An image of a part of the target object, or that of the whole target object, or a variation of the image of the part of the target object or the whole target object is subject to the method or apparatus provided by the present invention, where the variation does not need an inventive effort of a person skilled in the art, and falls into a protection scope of the present invention.

What is claimed is:

1. A method for focusing, comprising:
    determining an imaging mode switched from a first picture taking device in a first imaging mode to the first picture taking device or a second picture taking device in a second imaging mode;
    according to a first position of a target object in the first imaging mode and a principle of epipolar geometry, estimating a second position of the target object in the second imaging mode;
    searching for the target object in the second imaging mode according to the estimated second position of the target object in the second imaging mode.

2. The method according to claim 1, wherein:
    the estimating the second position of the target object in the second imaging mode comprises determining an epipolar line corresponding to the target object in the second imaging mode according to the first position of the target object in the first imaging mode and a fundamental matrix between the first picture taking device in the first imaging mode and the first picture taking device or the second picture taking device in the second imaging mode; and
    the searching for the target object in the second imaging mode comprises searching for the target object on the epipolar line.

3. The method according to claim 2, wherein the searching for the target object on the epipolar line comprises:

determining a first straight line comprising the first position of the target in the first imaging mode and an optical center of the second picture taking device;

determining a first searching point where the first straight line intersects the epipolar line;

determining a second straight line that is parallel with the first straight line and comprises the optical center of the second picture taking device;

determining a second searching point where the second straight line intersects the epipolar line, the second searching point being in a field of view in the second imaging mode; and searching for the target object on the epipolar line between the first searching point and the second searching point.

4. The method according to claim 3, wherein the searching for the target object on the epipolar line further comprises, when the second searching point is not in the field of view in the second imaging mode:

determining a third searching point where the first straight line intersects the epipolar line;

determining a fourth searching point where the epipolar line intersects a boundary of the field of view in the second imaging mode, the fourth searching point being located between the second searching point and the third searching point, and searching for the target object on the epipolar line between the third searching point and the fourth searching point.

5. The method according to claim 4, wherein the searching for the target object on the epipolar line further comprises, when the second searching point does not exist:

determining a fifth searching point where the first straight line intersects the epipolar line, determining a sixth searching point and a seventh searching point where the epipolar line intersects a boundary of the field of view in the second imaging mode, and searching for the target object on the epipolar line between the fifth searching point and the sixth searching point or searching for the target object on the epipolar line between the fifth searching point and the seventh searching point.

6. The method according to claim 2, wherein the determining the epipolar line corresponding to the target object in the second imaging mode comprises:

determining the epipolar line according to the following formula:

$$[u_L \; v_L \; 1] \cdot F \cdot \begin{bmatrix} u_R \\ v_R \\ 1 \end{bmatrix} = 0;$$

wherein the $(u_L, v_L)$ are coordinates of the target object on a left picture taking device from the first picture taking device in the first imaging mode and the first or the second picture taking device in the second imaging mode, the $(u_R, v_R)$ are coordinates of the target object on a right picture taking device from the first picture taking device in the first imaging mode and the first or the second picture taking device in the second imaging mode, and $F \in \mathbb{R}_{3 \times 3}$ is the fundamental matrix between the first picture taking device in the first imaging mode and the first or the second picture taking device in the second imaging mode.

7. The method according to claim 1, wherein the estimating the second position of the target object in the second imaging mode comprises, when the first picture taking device in the first imaging mode and the second picture taking device in the second imaging mode are on a same imaging plane:

estimating the second position of the target object in the second imaging mode according to (1) the first position of the target object on the first picture taking device in the first imaging mode, (2) depth information between the target object and the first picture taking device in the first imaging mode or the second picture taking device in the second imaging mode, (3) a focal length of the first picture taking device in the first imaging mode or the second picture taking device in the second imaging mode, and (4) a distance between the first picture taking device in the first imaging mode and the second picture taking device in the second imaging mode.

8. The method according to claim 7, wherein the estimating the second position of the target object in the second imaging mode comprises, when the first picture taking device in the first imaging mode and the second picture taking device in the second imaging mode are horizontally offset:

estimating the second position of the target object in the second imaging mode according to the following formula:

$$\frac{f}{Z} = \frac{x_L - x_R}{T_x};$$

wherein f is the focal length of the first picture taking device in the first imaging mode or the second picture taking device in the second imaging mode, Z is the depth information between the target object and the first picture taking device in the first imaging mode or the second picture taking device in the second imaging mode, $T_x$ is a horizontal distance between the first picture taking device in the first imaging mode and the second picture taking device in the second imaging mode, $x_L$ is a first horizontal coordinate of the first position of the target object on a left picture taking device, $x_R$ is a second horizontal coordinate of the second position of the target object on a right picture taking device, the picture taking device in the first imaging mode comprises the left picture taking device, and the picture taking device in the second imaging mode comprises the right picture taking device.

9. The method according to claim 7, wherein the estimating the second position of the target object in the second image mode further comprises, when the first picture taking device and the second picture taking device are vertically offset:

estimating the position of the target object in the second imaging mode according to the following formula:

$$\frac{f}{Z} = \frac{y_T - y_B}{T_y};$$

wherein f is the focal length of the first picture taking device in the first imaging mode or the second picture taking device in the second imaging mode, Z is the depth information between the target object and the first picture taking device in the first imaging mode or the second picture taking device in the second imaging mode, $T_y$ is a vertical distance between the first picture taking device in the first imaging mode and the second picture taking device in the second imaging mode, $y_T$ is a first vertical coordinate of the target object on an upper picture taking device, $y_B$ is a second vertical coordinate of the target object on a lower picture taking device, the picture taking device in the first imaging mode comprises the upper picture taking device, and the picture taking device in the second imaging mode comprises the lower picture taking device.

10. The method according to claims 1, wherein, before the estimating the second position of the target object in the second imaging mode, the method further comprises:

when the first picture taking device in the first imaging mode and the second picture taking device in the second imaging mode are on a same imaging plane, and when the picture taking device in the first imaging mode and the second picture taking device in the second imaging mode are horizontally offset, transforming coordinates of a pixel $(u_L, v_L)$ on a left picture taking device from the first picture taking device in the first imaging mode and the second picture taking device in the second imaging mode to $(u_L', v_L')$, and transforming coordinates of a pixel $(u_R, v_R)$ on a right picture taking device of the first picture taking device in the first imaging mode and the second picture taking device in the second imaging mode to $(u_R', v_R')$:

$$[u'_L, v'_L, 1] = K \cdot K_L^{-1} \cdot [u_L, v_L, 1]^T,$$

$$[u'_R, v'_R, 1] = K \cdot K_R^{-1} \cdot [u_R, v_R, 1]^T,$$

wherein before the transforming,
a camera matrix of the left picture taking device is $$K_L = \begin{bmatrix} f_x^L & 0 & c_x^L \\ 0 & f_y^L & c_y^L \\ 0 & 0 & 1 \end{bmatrix},$$

a camera matrix of the right picture taking device is $$K_R = \begin{bmatrix} f_x^R & 0 & c_x^R \\ 0 & f_y^R & c_y^R \\ 0 & 0 & 1 \end{bmatrix},$$

$(f_x^L, f_y^L)$ are coordinates of a focal point of the left picture taking device,
$(f_x^R, f_y^R)$ are coordinates of a focal point of the right picture taking device,
$(c_x^L, c_y^L)$ are coordinates of a principal point of the left picture taking device,
$(c_x^R, c_y^R)$ are coordinates of a principal point of the right picture taking device; and wherein after the transforming, a new camera matrix of the left picture taking device and a new camera matrix of the right picture taking device are $$K = \begin{bmatrix} f & 0 & c_x \\ 0 & f & c_y \\ 0 & 0 & 1 \end{bmatrix},$$

where f is a transformed focal length, and $(c_x, c_y)$ are coordinates of a transformed principal point.

11. The method according to claim 1, wherein the method further comprises:
obtaining luminance information of a first feature template of the target object in the first imaging mode;
making luminance adjustment to the luminance information of the first feature template to obtain a second feature template;
wherein the second feature template is used to search for the target object in the second imaging mode.

12. The method according to claim 1, wherein the first imaging mode and the second image mode each comprises one of an imaging mode of a color picture taking device, an imaging mode of a black-and-white picture taking device, and an imaging mode of a depth picture taking device.

13. The method according to claim 1, wherein the first picture taking device in the first imaging mode and the second picture taking device in the second imaging mode constitute a dual camera system.

14. A non-transitory computer-readable medium storing computer instructions that, when executed by a processor, causes the processor to perform the steps of claim 1.

* * * * *